US010557753B2

(12) United States Patent
Loi et al.

(10) Patent No.: US 10,557,753 B2
(45) Date of Patent: Feb. 11, 2020

(54) SPECTROMETER APPARATUS

(71) Applicant: STMicroelectronics S.r.l., Agrate Brianza (IT)

(72) Inventors: Sara Loi, Villaputzu (IT); Alberto Pagani, Nova Milanese (IT); Guido Chiaretti, Milan (IT)

(73) Assignee: STMICROELECTRONICS S.R.L., Agrate Brianza, MB (IT)

( * ) Notice: Subject to any disclaimer, the term of this patent is extended or adjusted under 35 U.S.C. 154(b) by 16 days.

(21) Appl. No.: 15/938,605

(22) Filed: Mar. 28, 2018

(65) Prior Publication Data

US 2019/0301930 A1    Oct. 3, 2019

(51) Int. Cl.
| | | |
|---|---|---|
| *G01N 21/25* | (2006.01) | |
| *G01J 3/02* | (2006.01) | |
| *G01J 3/28* | (2006.01) | |
| *G01J 3/14* | (2006.01) | |
| *G01J 3/12* | (2006.01) | |

(52) U.S. Cl.
CPC ........... *G01J 3/0237* (2013.01); *G01J 3/0229* (2013.01); *G01J 3/14* (2013.01); *G01J 3/2803* (2013.01); *G01J 2003/1269* (2013.01); *G01J 2003/2806* (2013.01)

(58) Field of Classification Search
CPC ...... G01J 3/0237; G01J 3/0229; G01J 3/2803; G01J 3/14; G01J 2003/2806; G01J 2003/1269; G01J 3/36; G01J 3/12
See application file for complete search history.

(56) References Cited

U.S. PATENT DOCUMENTS

| | | | |
|---|---|---|---|
| 8,274,739 B2 | 9/2012 | Lee et al. | |
| 8,462,420 B2 | 6/2013 | Lee et al. | |
| 2006/0006485 A1* | 1/2006 | Mouli | H01L 27/14627 257/432 |
| 2014/0001521 A1 | 1/2014 | Pagani | |
| 2014/0320858 A1 | 10/2014 | Goldring et al. | |
| 2018/0080823 A1* | 3/2018 | Bae | G01J 3/12 |
| 2018/0238735 A1* | 8/2018 | Rosen | G01J 3/10 |

* cited by examiner

*Primary Examiner* — Abdullahi Nur
(74) *Attorney, Agent, or Firm* — Slater Matsil, LLP

(57) ABSTRACT

A spectrometer includes a substrate; a plurality of light detectors in the substrate; and a plurality of light filters over the plurality of light detectors, each of the plurality of light filters transmitting a different wavelength or reflecting a different wavelength, each of the light filters aligned with a corresponding one of the plurality of light detectors.

20 Claims, 27 Drawing Sheets

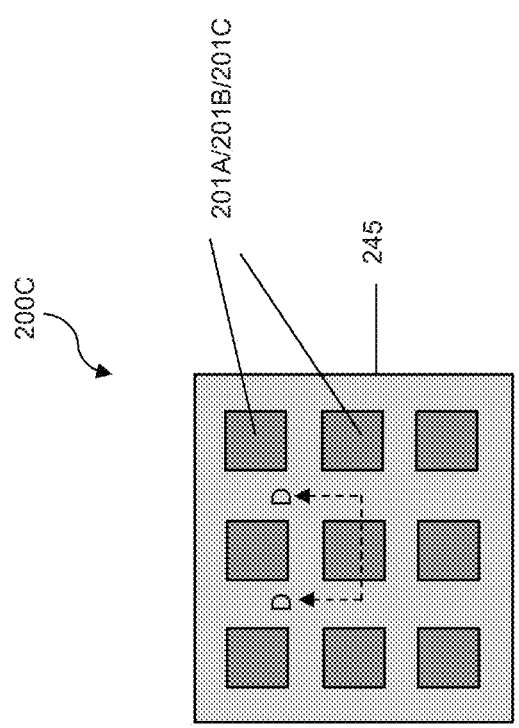

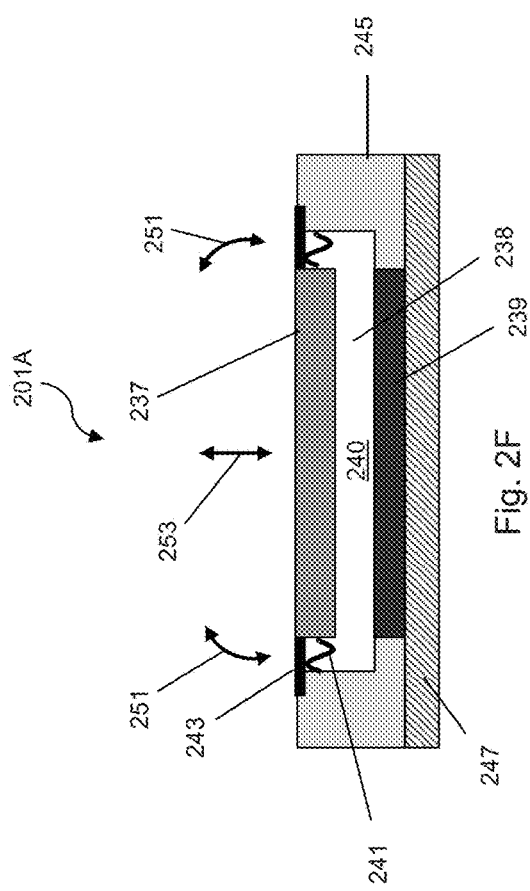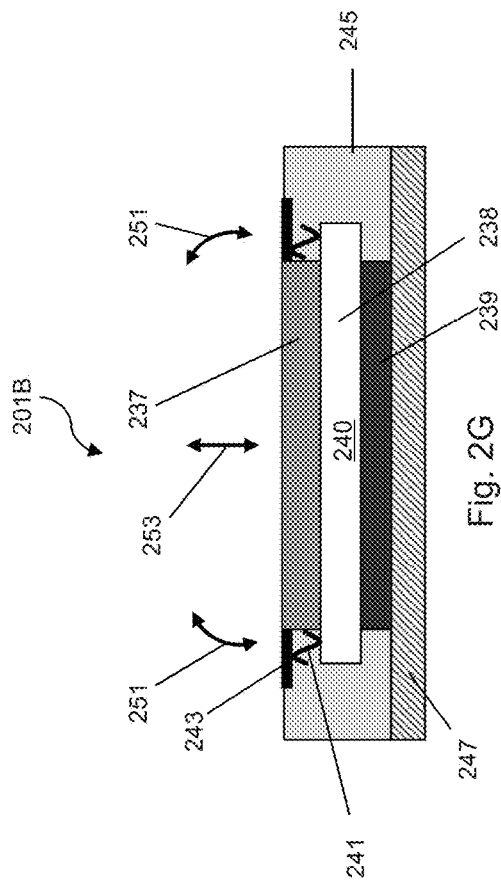

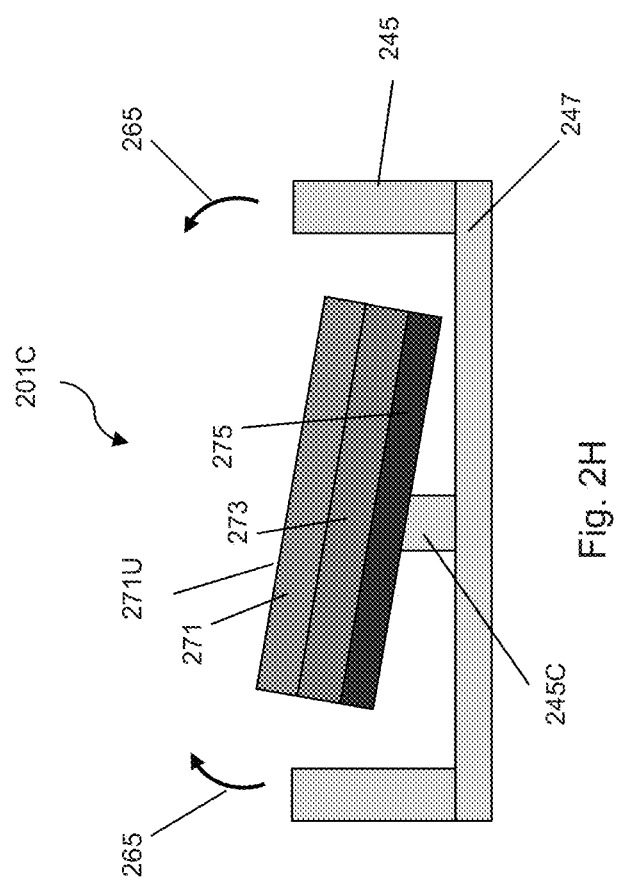

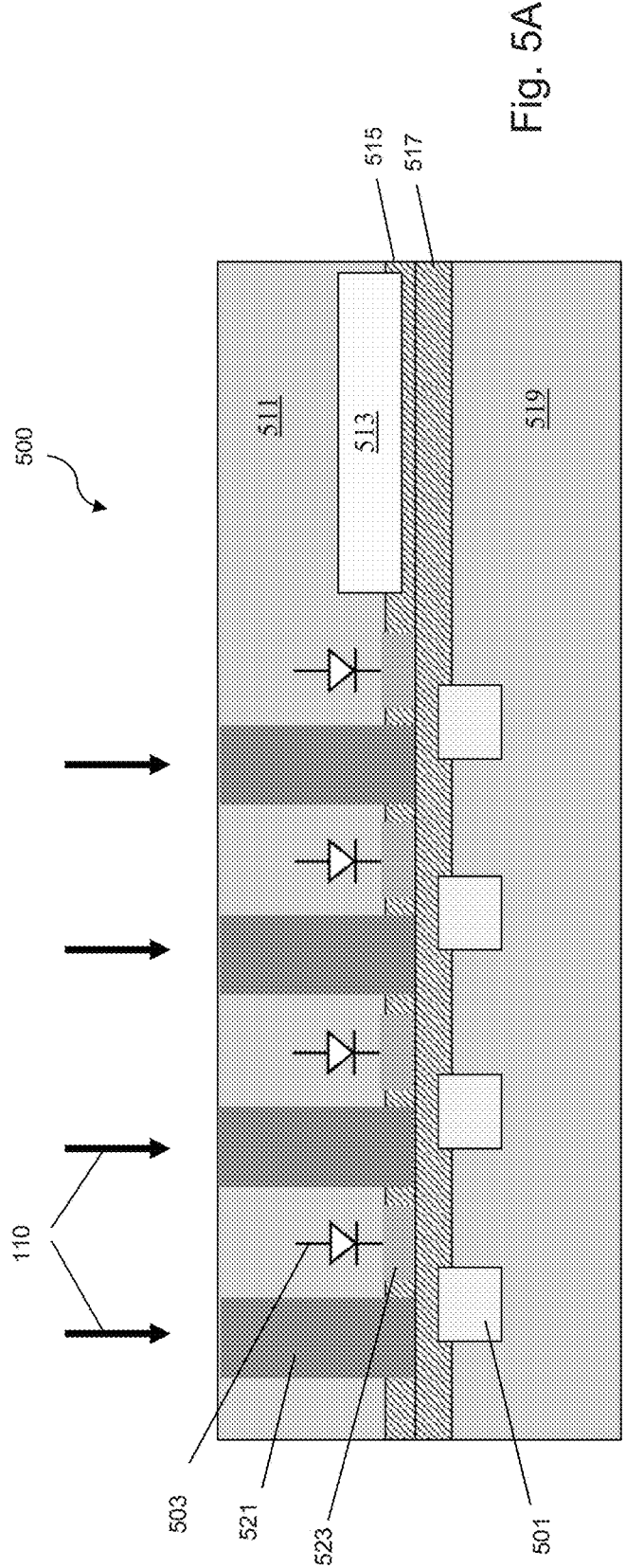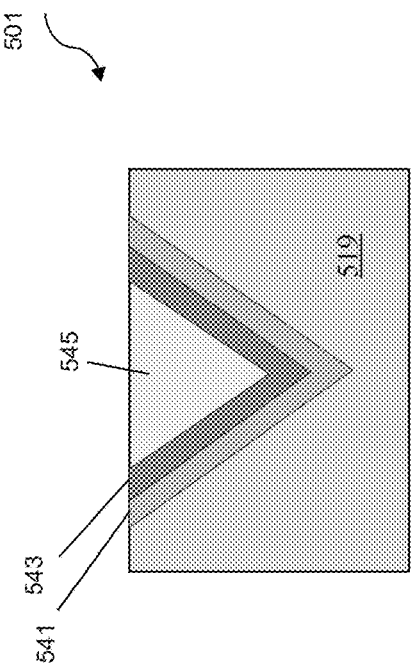

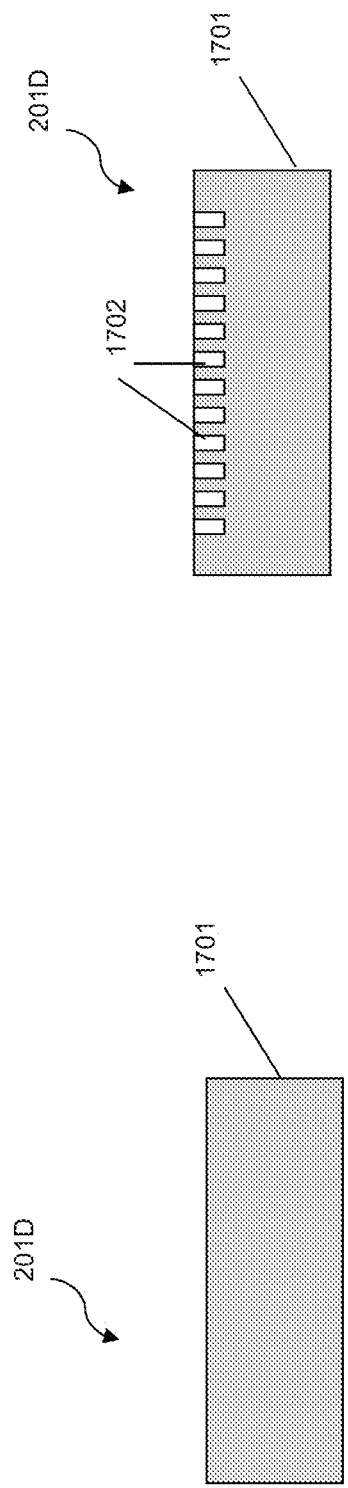
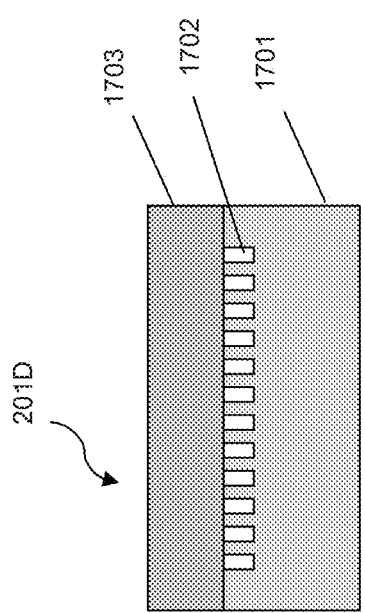
Fig. 17A
Fig. 17B
Fig. 17C

SPECTROMETER APPARATUS

TECHNICAL FIELD

The present disclosure relates generally to spectrometers, and, in particular embodiments, to miniaturized spectrometers suitable for, e.g., integration with semiconductor devices.

BACKGROUND

An optical spectrometer (also referred to as a spectrometer) is an instrument used to measure properties of light over a specific portion of the electromagnetic spectrum. The variable measured is the light's intensity for each light frequency. Spectrometers were developed in early studies of physics, astronomy, and chemistry. The capability of spectroscopy to determine chemical composition drove its advancement and continues to be one of its primary uses. Spectrometers are used in astronomy to analyze the chemical composition of stars and planets.

A spectrometer often comprises an optical system and optical detectors. The optical system causes optical dispersion of the light by, e.g., refraction using a prism, or by diffraction using a diffraction grating. The optical detectors detect different components of the dispersed light with different frequencies. For example, in a spectrometer using prism, a slit selects a thin strip of light which passes through the collimator and gets parallelized. The parallelized light then passes through the prism, in which it is refracted twice (once when entering and once when leaving). Due to the nature of the dispersive element, the angle with which light is refracted depends on its wavelength. This leads to a spectrum of thin lines of light, which may be detected by the optical detectors. Replacing the prism with a diffraction grating result in a grating spectrometer.

Recently, there has been a growing interest in developing miniaturized spectrometers that may be integrated into or with semiconductor devices for use in digital mobile devices, such as smart phones, tablets, or the like. New applications enabled by the miniaturized spectrometers integrated in digital mobile devices may encompass many aspects of everyday life, such as assessing the quality of food, material analysis for detecting counterfeit products, fitness and health detection, or telemedicine.

SUMMARY

In some embodiments, a spectrometer includes a substrate, a plurality of light detectors in the substrate, and a plurality of light filters over the plurality of light detectors, each of the plurality of light filters transmitting a different wavelength or reflecting a different wavelength, each of the light filters aligned with a corresponding one of the plurality of light detectors.

In some embodiments, a spectrometer includes a substrate, a plurality of light detectors in the substrate, a first layer over the substrate, and a prism at least partially in the first layer, the prism comprising an electro-optic material.

In some embodiments, a method includes filtering an optical signal using an array of light filters, the array of light filters comprising a first light filter and a second light filter, the first light filter letting through a first transmitted optical signal having a first wavelength, the second light filter letting through a second transmitted optical signal having a second wavelength different from the first wavelength, and detecting the first transmitted optical signal and the second transmitted optical signal. The light filters may be for example polarizing filters, useful to perform a separate spectral analysis for each light polarization component.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 2E-2H illustrate various views of different spectrometers, in accordance with various embodiments.

FIGS. 5A and 5B illustrate cross-sectional views of a spectrometer, in accordance with an embodiment.

FIGS. 17A-17E illustrate a light filter having subwavelength structures at various stages of fabrication, in an embodiment.

DETAILED DESCRIPTION

Figure 1B:
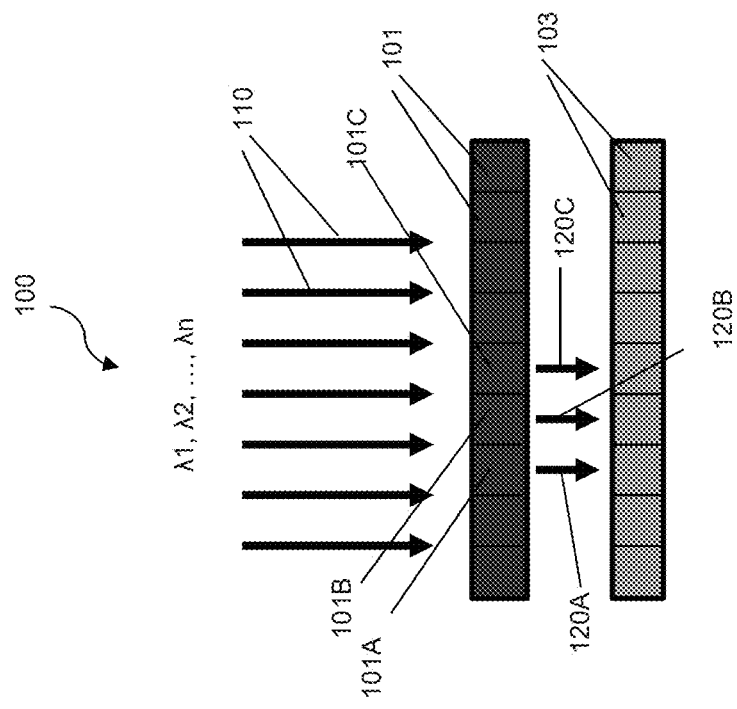
FIGS. 1A-1C illustrate various views of a spectrometer, in accordance with an embodiment.

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Embodiments of the present disclosure are discussed in the context of miniaturized spectrometers, and in particular, spectrometers suitable for integration in optoelectronics devices. In some embodiments, a spectrometer includes one or more light filters, and each of the light filters reflects a different wavelength or transmits a different wavelength. The reflected light or the transmitted light from each of the light filters is detected by a corresponding light detector. The light filter may be an interferential filter, a plasmonic filter, a filter based on quantum structures (e.g. quantum dots, quantum wires), or a filter based on subwavelength structures designed to filter selected wavelength(s). The light filters may each comprise an electro-optic material, such that the optical characteristics (e.g., the wavelength of the transmitted and/or the reflected light, or the polarization) can be adjusted electrically. In some embodiments, the optical characteristics of each light filter is adjusted over time, such that a same light filter is used to transmit (or reflect) light having a first wavelength at a first time instant, and the same light filter is subsequently used to transmit (or reflect) light having a second wavelength at a second time instant, where the second wavelength is different from the first wavelength. In some embodiments, a spectrometer includes a prism integrated in a semiconductor device. The prism may comprise an electro-optic material such that the optical characteristics of the prism may be adjusted electrically. In some embodiments, the spectrometer additionally includes movable microelectromechanical systems (MEMS) arms, and the movable MEMS arms mechanically adjust a position of the prism.

Figure 1A:
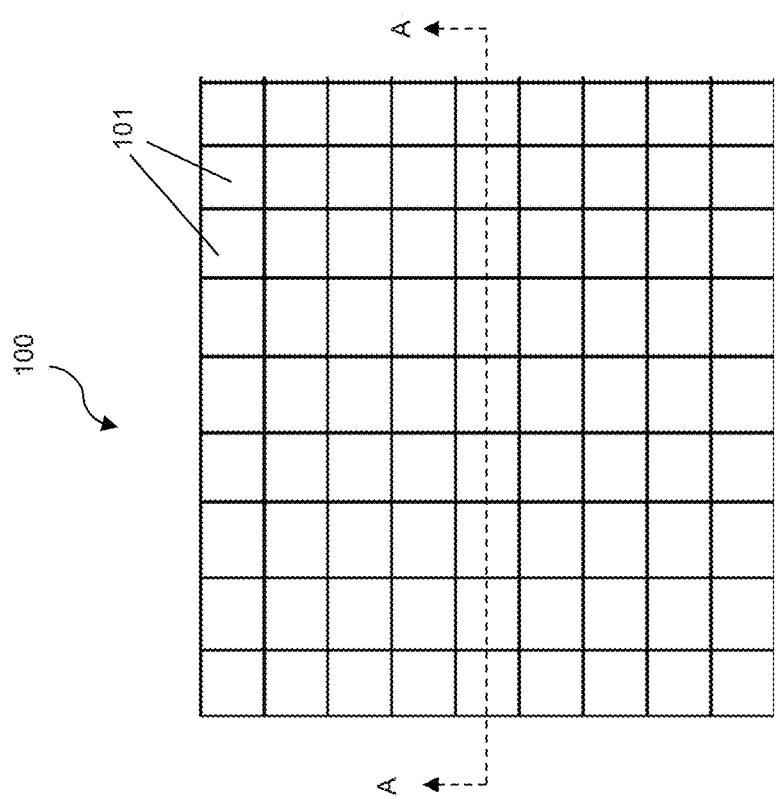
Figure 1C:
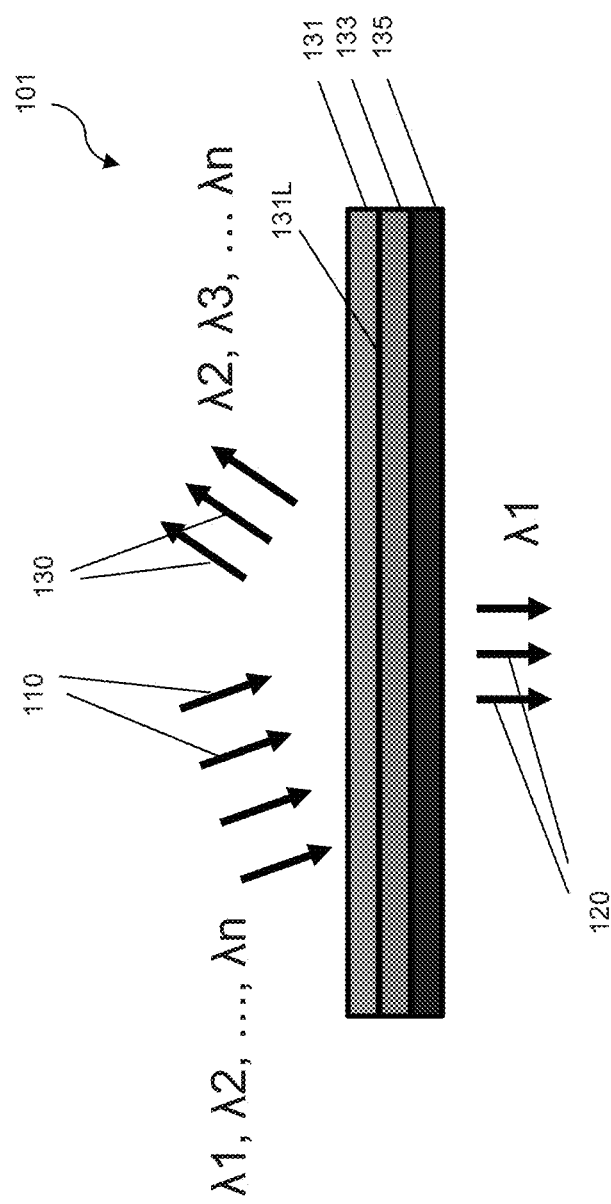

FIGS. 1A-1C illustrate various views (e.g., top view, cross-sectional view) of a spectrometer 100. FIG. 1A illustrate a top view of the spectrometer 100. The spectrometer 100 comprises a plurality of light filters 101, which are configured in a matrix form. As illustrated in FIG. 1A, the light filters 101 form a matrix with multiple rows and multiple columns. In an exemplary embodiment, the number of light filters 101 in the matrix of light filters 101 is equal to the number of different wavelengths the spectrometer 100 detects. The number of rows and the number of columns illustrated in FIG. 1A serve merely as an example, other numbers of rows and other number of columns are also possible and are fully intended to be included within the scope of the present disclosure.

FIG. 1B illustrates the cross-sectional view of the spectrometer 100 along cross-section A-A in FIG. 1A. Note that for clarity, not all elements of the spectrometer 100 are illustrated. As illustrated in FIG. 1B, a plurality of light detectors 103, such as photo diodes or other suitable light detectors, are disposed under (e.g., directly under) the light filters 101. Each of the light detectors 103 is optically aligned with a respective light filter 101, such that light passing through a light filter 101 (also referred to as the transmitted light of a light filter, or as a transmitted optical signal of a light filter) is detected by a corresponding light detector 103. Therefore, in the example of FIGS. 1A and 1B, the light detectors 103 are also configured in a matrix having a same size (e.g., number of rows and number of columns) as the matrix of the light filters 101.

FIG. 1B illustrates the filtering of incident light 110 by the light filters 101. The light 110 (may also be referred to as an optical signal) may be a broad spectrum light that comprises light components having a plurality of wavelengths (e.g., $\lambda_1$, $\lambda_2$, $\lambda_n$). For example, the light 110 may include light components in a portion of the visible light spectrum, such as lights having wavelengths between about 400 nm to about 700 nm. The light 110 may include invisible lights, such as infrared light, ultraviolet light, or the like, as examples. In some embodiments, each of the light filter 101 transmits (e.g., passes, or lets through) a light component of the light 110, which light component has a wavelength different from wavelengths of other light components transmitted by other light filters 101. For example, a light filter 101A lets through light component 120A having a wavelength $\lambda_1$, a light filter 101B lets through light component 120B having a wavelength $\lambda_2$, and a light filter 101C lets through light component 120C having a wavelength $\lambda_3$, where $\lambda_1$, $\lambda_2$, and $\lambda_3$ are different. Therefore, although light 110 impinges on all of the light filters 101, the transmitted light components (e.g., 120A, 120B, and 120C) of the light filters 101 each has a different wavelength. The transmitted light of each of the light filters 101 is detected by a respective light detector 103. The output of light detectors 103 indicates the intensity of each transmitted light, which output may be recorded and used to reconstruct the spectrum of the light 110, in some embodiments. In some embodiments, a pitch (e.g., distance between centers of adjacent light filters 101) of the light filters 101 is a multiple (e.g., one time (1×), twice (2×), or more) of a pitch (e.g., distance between centers of adjacent light detectors 103) of the light detectors 103.

In the discussion hereinafter, the phrase "a light filter transmits a wavelength" may be used to describe that the light filter transmits a light component having the wavelength. Similarly, the phrase "a light filter reflects a wavelength" may be used to describe that the light filter reflects a light component having the wavelength.

FIG. 1C illustrates the cross-sectional view of a single light filter 101 of FIGS. 1A and 1B. In the example of FIG. 1C, the light filter 101 comprises a plurality of layers, such as layers 131, 133, and 135. Each of the layers 131, 133, and 135 may comprises a suitable material such as an oxide (e.g., silicon oxide), a semiconductor material (e.g., silicon, germanium, or the like), a polymer, a metamaterial, a metal (e.g., a thin metal film), a gas, or a fluid. Each of the layers 131, 133, and 135 may be formed to be substantially uniform (e.g., having a substantially uniform thickness), patterned (e.g., having openings with designed patterns and formed of selected materials such as gold), or nanostructured (e.g., having material structure like rough surface, quantum dots, nano-wires, nano-tubes, or similar structures having sizes up to, e.g., in the order of 100 nm to enhance the quantum confinement effects). The patterned structures may be, e.g., plasmonic structures or subwavelength structures. It is possible, for example, to modulate the filtered wavelength by adjusting the size of the nanostructure, thereby causing a change in the energy bandgap of the material (e.g. ZnSe, InP), or to modulate the refractive index by adjusting the size of the subwavelength structure. An embodiment method for forming light filters having subwavelength structures is discussed hereinafter with reference to FIGS. 17A-17E.

In some embodiments, each of the layers 131, 133, and 135 has a refractive index that is different from a refractive index of an adjacent layer, and there is a step or gradual change in the refractive indexes of adjacent layers at the interface between the adjacent layers (e.g., an interface between 131 and 133, or an interface between 133 and 135). For example, the layer 131 may have a first refractive index at the interface 131L between the layer 131 and the layer 135, the layer 135 may have a second refractive index at the interface 131L, and there is a change between the first refractive index and the second refractive index. In some embodiments, the layers 131, 133, and 135 are formed of a same material, but with each layer comprising a different pattern(s), a different nanostructure(s), or a different subwavelength structure(s).

In some embodiments, the refractive indexes of the layers 131, 133, and 135 and the thicknesses of the layers 131, 133, and 135 may be determined by, e.g., calculation or simulation using commercial software based on the physics of light interference of multiple beams in multiple layers. For example, the layers 131 and 135 may be formed of a material (e.g., $SiO_2$) having a thickness in the order of 100 nm, and the layers 133 may be formed of a material (e.g., Al) having a thickness in the order of 10 nm.

In an embodiment, one of the layers (e.g., 133) of the light filter 101 may be formed using a sacrificial material (e.g., silicon oxide), which sacrificial material is removed later using, e.g., an etching process. The etching process may use an etchant having a high etching selectivity (e.g., higher etching rate) for the sacrificial material, such that the sacrificial material is removed without substantially attacking other layers of the light filter 101. Once the sacrificial material is removed, the space previously occupied by the sacrificial material may be filled by a gas (e.g., ambient air, a single gas, or a mixture of gases) or a fluid with a target refractive index. Therefore, in some embodiments, the light filter 101 may have layers (e.g., 131, 135) comprising solid materials, and may have at least one layer (e.g., 133) comprising a gas or a fluid.

In some embodiments, the refractive index and/or the thickness of each layer 131, 133, and 135 are adjusted, e.g., by calculations or simulations, to determine the optical characteristics of the light filter 101, such that the light filter 101 transmits a wavelength $\lambda_1$ and reflects other wavelengths $\lambda_2, \lambda_3, \ldots, \lambda_n$, where $\lambda_1, \lambda_2, \lambda_3, \ldots, \lambda_n$ are wavelengths of the light components of the incident light 110. In other embodiments, the light filter 101 is designed to reflect a wavelength $\lambda_1$ and transmits other wavelengths $\lambda_2, \lambda_3, \ldots, \lambda_n$, in which case (not shown in FIG. 1B) the light detectors 103 are placed on a same side of the light filters 101 with the incident light 110, with the light detectors 103 having appropriate angular position with respect to the light filters 101 such that the reflected light impinges on the light detectors 103. The light filter 101 in FIG. 1C may also be referred to as an interferential filter, since the design of the light filter 101 is based on the physics of light interference. As discussed above, each light filter 101 has a different design (e.g., different material(s), different thickness of each layer, combinations thereof, or the like) such that each light filter 101 transmits a different wavelength.

FIG. 1C shows three layers 131, 133, and 135 in the light filer 101 as a non-limiting example. Other numbers of layers, e.g., two, fourth, or more than four, are also possible and are fully intended to be included within the scope of the present disclosure. In addition, one skilled in the art will appreciate that in the discussion herein, when a light filter (e.g., 101) is said to transmit (or reflect) a wavelength k, the light filter transmits (or reflects) a narrow band of wavelengths around k. In other words, instead of passing a light component with a single wavelength k, the light filter (e.g., 101) passes a narrow band of light components having wavelengths between, e.g., $\lambda-\Delta_1$ and $\lambda+\Delta_2$, where $\Delta_1$ and $\Delta_2$ are values such as about 50 nm or other suitable values, depending on, e.g., the application of the spectrometer and/or the targeted spectral resolution of the spectrometer.

By forming a matrix of light filters 101, where each light filler 101 passes a different wavelength, the spectrometer 100 shown in FIGS. 1A-1C allows for a compact, small format factor design for efficient spatial wavelength dispersion and analysis of the incident light 110. The spectrometer 100 is therefore well suited for integration into semiconductor devices to form miniaturized spectrometers.

Figure 17E:
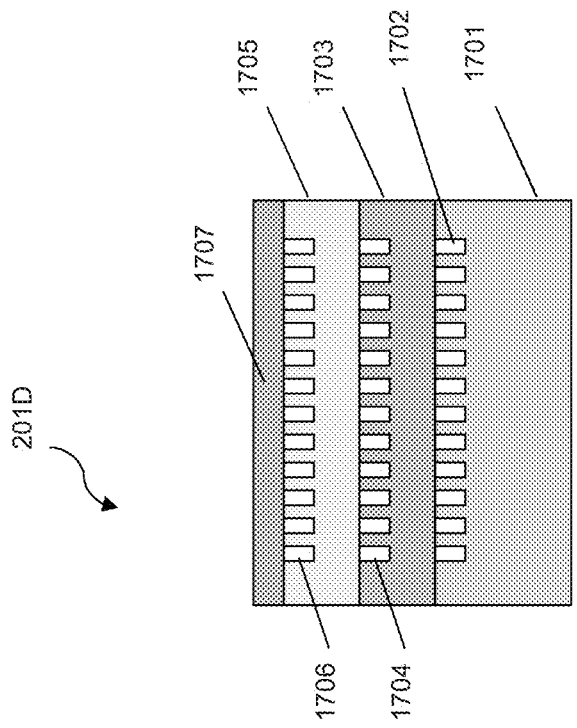

Referring now temporarily to FIGS. 17A-17E, FIGS. 17A-17E illustrate a light filter 201D having subwavelength structures at various stages of fabrication. In FIG. 17A, a semiconductor substrate 1701 (e.g., silicon) is provided. Next, in FIG. 17B, a plurality of openings 1702 are formed at the upper surface of the substrate 1701. The openings 1702 may be formed using, e.g., photolithography and etching techniques. The openings 1702 may have a width in the order of 1 µm, and a depth in the order of 10 µm, as examples, although other dimensions are also possible, depending on the wavelength of the light. The number of openings 1702 and the distance between adjacent ones of the openings 1702 may comprise any suitable number and are determined by the design of the light filter 201D.

Next, in FIG. 17C, an epitaxial layer 1703 (e.g., monocrystalline silicon) is formed over the substrate 1701. The epitaxial layer 1703 (e.g., a semiconductor layer) seals the openings 1702, in some embodiments. A gas may be sealed in the sealed openings 1702. The gas sealed in the openings 1702 may be a process gas in the deposition chamber for forming the epitaxial layer 1703. In some embodiments, the gas sealed in the openings 1702 comprises a gas injected into the openings 1702, which injected gas has a target physical (e.g., optical) characteristics for forming the light filter 201D. In some embodiments, there is substantially no gas in the sealed openings 1702, and the sealed openings 1702 may be at low pressure that can be obtained through a getter material. In yet other embodiments, the openings 1702 are not sealed.

Figure 17D:
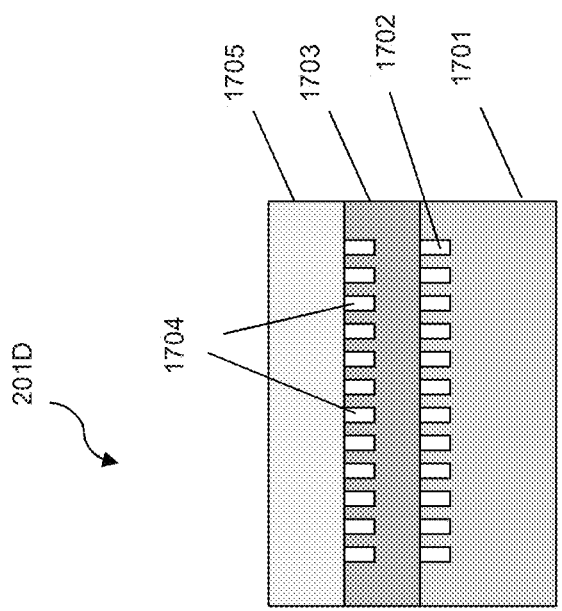

Next, in FIG. 17D, openings 1704 are formed in the epitaxial layer 1703, and an epitaxial layer 1705 (e.g. a semiconductor layer) is formed over the epitaxial layer 1703. The epitaxial layer 1705 may be formed of a same material as the epitaxial layer 1703, although a different material may also be used, depending on, e.g., the design of the light filter 201D. The number and the dimension of the openings 1704 are determined by the design of the light filter 201D, and therefore, may be different from (or the same as) the number and the dimension of the openings 1702. Methods for forming the openings 1704 may be the same as or similar to those for forming the openings 1702, thus are not repeated. The epitaxial layer 1705 may seal the openings 1704, and a gas may be sealed inside the sealed openings 1704. In some embodiments, the sealed openings 1704 comprise a vacuum. In some embodiments, the openings 1704 are not sealed.

Next, in FIG. 17E, openings 1706 are formed in the epitaxial layer 1705, and an epitaxial layer 1707 is formed over the epitaxial layer 1705. The epitaxial layer 1707 may be formed of a same material as the epitaxial layer 1703 or 1705, although a different material may also be used, depending on, e.g., the design of the light filter 201D. The number and the dimension of the openings 1706 are determined by the design of the light filter 201D, and therefore, may be different from (or the same as) the number and the dimension of the openings 1702 and/or 1704. Methods for forming the openings 1706 may be the same as or similar to those for forming the openings 1702, thus are not repeated. The epitaxial semiconductor layer 1707 may seal the openings 1706, and a gas may be sealed inside the sealed openings 1706. In some embodiments, the sealed openings 1706 comprise a vacuum. In some embodiments, the openings 1706 are not sealed. The number of layers of the light filter 201D illustrated in FIGS. 17A-17E is for illustration purpose and not limiting, other numbers are also possible and are fully intended to be included within the scope of the present disclosure.

Figure 2C:
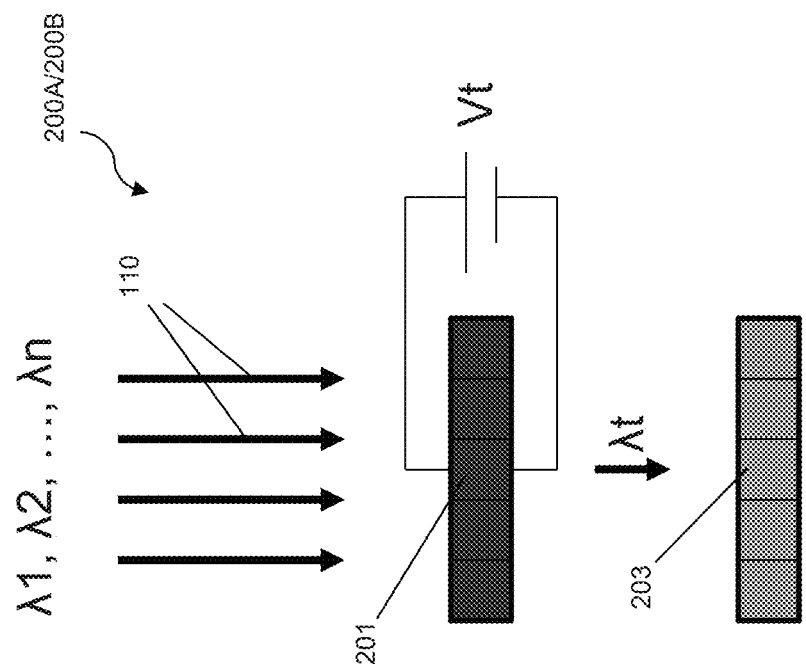
FIGS. 2A-2D illustrate various views of a spectrometer, in accordance with an embodiment.
Figure 2A:
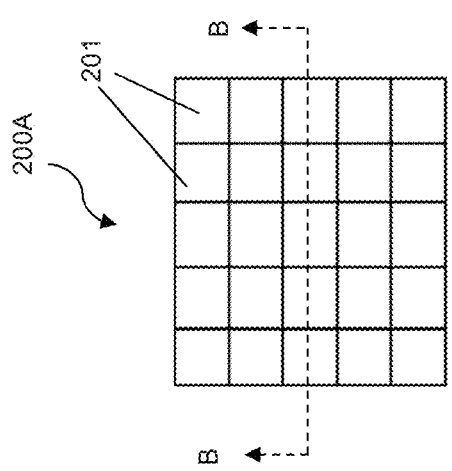
Figure 2B:
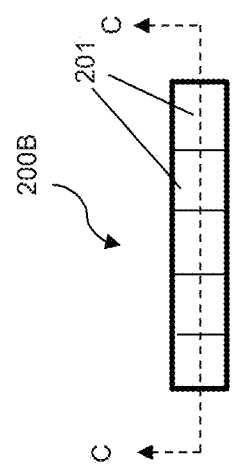

Referring now to FIGS. 2A-2D, FIGS. 2A-2D illustrate various views (e.g., top view, cross-sectional view) of a spectrometer 200 (e.g., 200A or 200B). The spectrometer 200A in FIG. 2A, shown in a top view, comprises a plurality of light filters 201 arranged in a matrix form (e.g., having multiple columns and multiple rows). FIG. 2B illustrates the top view of the spectrometer 200B having an array (e.g., having one row or one column) of light filters 201. In some embodiments, the number of light filters 201 in the spectrometer 200A/200B, denoted by $N_1$, is smaller than the number of different wavelengths $N_2$ the spectrometer 200A/200B detects. In an embodiment, the spectrometer 200B has only one light filter 201 and one corresponding light detector 203.

In the illustrated embodiments, each of the light filters 201 comprises at least one electro-optic material, such that the optical characteristics (e.g., transmitted wavelength or polarization) of the light filter 201 can be changed by, e.g., adjusting electrical voltage applied to the material. Therefore, the spectrometer 200A or 200B achieves detection of $N_2$ different wavelengths using $N_1$ ($N_1 < N_2$) light filters 201 by changing the optical characteristics of each light filter 201 over time, such that the wavelength of the transmitted optical signal of each light filter 201 is changed over time, thereby allowing each light filter 201 to pass different wavelengths over time. Details of the light filters 201 and method for changing the optical characteristics of the light filters 201 are discussed in details hereinafter.

Referring to FIG. 2C, which illustrates the cross-sectional view of the spectrometer 200A along cross-section B-B of FIG. 2A, or a cross-section view of the spectrometer 200B along cross-section C-C of FIG. 2B. As illustrated in FIG. 2C, the light 110, which may be a broad spectrum light having light components with wavelengths $\lambda_1, \lambda_2, \lambda_3, \ldots, \lambda_n$, impinges on the light filters 201. Each light filter 201 transmits a wavelength $\lambda_t$, which $\lambda_t$ is different from the wavelength transmitted by another light filter 201 of the spectrometer 200A/200B. A plurality of light detectors 203 are disposed under the light filters 201, with each light detector 203 optically aligned with a respective light filter 201 to detect the transmitted light from the respective light filter 201. Therefore, in a first round of processing, $N_1$ different wavelengths pass through the light filters 201 and are detected by the light detectors 203.

Next, the optical characteristics of each light filters 201 are changed to allow a different wavelength to pass through. Since each light filter 201 comprises at least one electro-optic material, the optical characteristics of each of the light filters 201 can be changed, e.g., by changing a voltage applied to the light filter 201, or by changing a temperature of the light filter 201. FIG. 2C illustrates a voltage $V_t$ being applied to one of the light filters 201 for illustration purpose only. It is understood that each of the light filters 201 may have an individual control parameter (e.g., a voltage, or a temperature) applied and modified to change its optical characteristics (e.g., transmitted wavelength or polarization). In some embodiments, $N_1$ individual control parameters are modified independently of each other to change the optical characteristics of each of the light filters 201. Therefore, in a second round of processing, the light filters 201 allows another $N_1$ different wavelengths to pass through the light filters 201 and to be detected by the light detectors 203. This process can be repeated for M times, until the number of wavelengths detected, denoted as $M \times N_1$, is equal to or larger than $N_2$ (e.g., $M \times N_1 \geq N_2$).

Various methods to change the voltage, or the temperature of each of the light filters 201 are possible and are fully intended to be included within the scope of the present disclosure. As an example, each light filter 201 may have a resistive element (e.g., resistor) attached. By changing the voltage applied to the resistive element, the heat generated by an electrical current flowing through the resistive element may be adjusted to modify the temperature of each of the light filters 201.

Figure 2D:
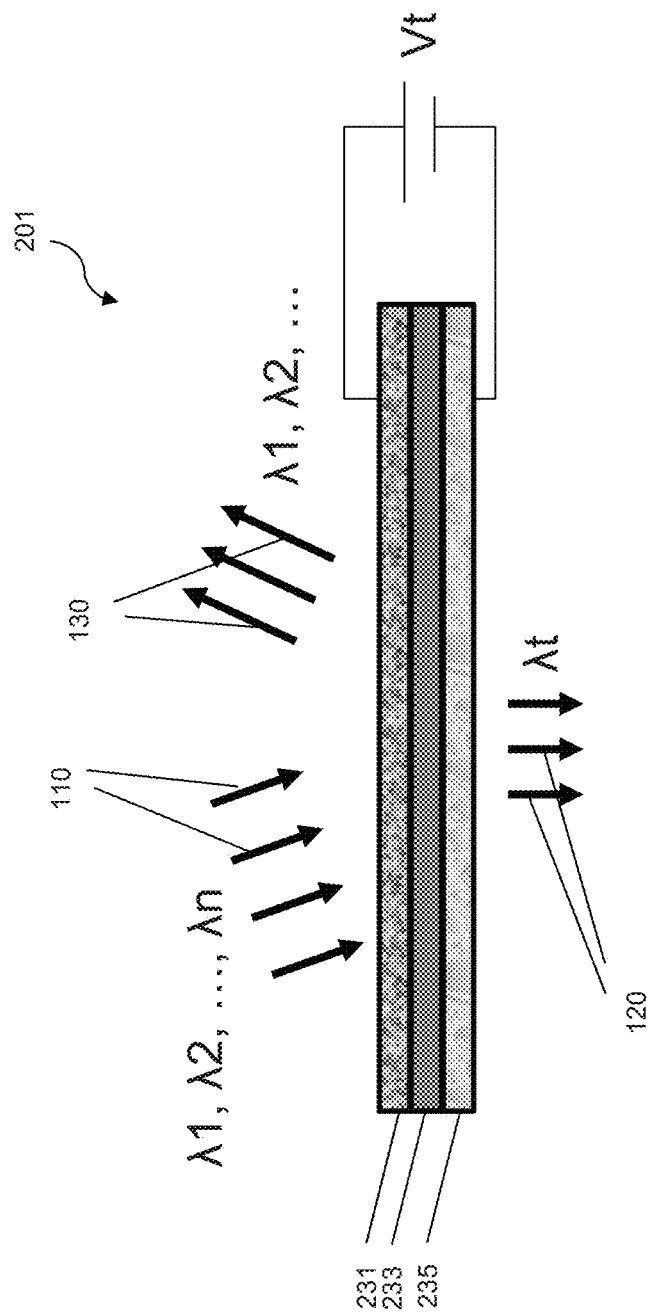

FIG. 2D illustrates the cross-sectional view of the light filter 201 in FIGS. 2A-2C. The light filter 201 include a plurality of layers, e.g., 231, 233 and 235. At least one of the layers 231, 233 and 235 comprises an electro-optic material, which may have linear or non-linear electro-optic characteristics. The layers 231, 233 and 235 may comprise any suitable material such as hydrogenated amorphous silicon, liquid crystal, or polymer (e.g., polyimide). The optical characteristics of the electro-optic material may be modified by a control parameter such as voltage, or temperature. By changing the optical characteristics of the electro-optic material (e.g., refractive index or propagation properties for different polarization components), the light propagation in the material (e.g., amplitude, transmission, reflection, polarization) may be modified. This, coupled with the light interference in the different layers of the light filter 201, may change the wavelength of the light transmitted (or reflected) by the light filter 201 and may select different polarization components. Therefore, the light filter 201 may be referred to as an active light filter or an active interferential filter. In contrast, the optical characteristics of the light filter 101 in FIG. 1C is not configured to be adjustable, and therefore, the light filter 101 may also be referred as a passive filter or a passive interferential filter.

In some embodiments, the material of each layer (e.g., 231, 233, or 235), the thickness of the each layer, and/or the control parameter (e.g., voltage, or temperature) of the electro-optic material are designed to achieve certain target optical characteristics (e.g., transmitted wavelength, or reflected wavelength) for the light filter 201. In some embodiments, one or more layers of the light filter 201 may be formed by a sacrificial material, which sacrificial material is later removed and replaced by a gas or a fluid, similar to the discussion above with reference to FIG. 1C, thus details are not repeated.

FIG. 2D illustrates three layers 231, 233, and 235 as a non-limiting example. Other number of layers are also possible and are fully intended to be included within the scope of the present disclosure. Although FIG. 2D illustrates one wavelength $\lambda_t$ passing through the light filter 201 at a time, the light filter 201 may be designed to pass through more than one wavelengths at a same time, depending on, e.g., the application and requirements of the spectrometer.

By modifying the optical characteristics of each of the light filters 201, each of the light filters 201 may be used to filter (e.g., pass through or reflect) different wavelengths at different time. This allows for temporal wavelength dispersion in addition to spatial wavelength dispersion, which means the number of light filters (e.g., $N_1$) in the spectrometer 200A/200B may be smaller than the number of wavelengths (e.g., $N_2$) to be analyzed by the spectrometer. In other words, a trade-off between speed and size can be made for the spectrometer 200A/200B. For example, a smaller number of light filters 201 may be used to form a very compact spectrometer, but the total time used for analyzing the spectrum of the light may be increased, due to the sequential processing (due to temporal wavelength dispersion) performed to cover all the wavelengths.

In some embodiment, the electro-optic material may be used to control in real time the polarization, in order to perform a separate spectral analysis for each polarization components. This analysis can be performed in separate regions of the passive filter matrix 100 in FIG. 1A or in different temporal sequences.

FIG. 2E illustrates a top view of a spectrometer 200C with light filters 201A, 201B, or 201C. FIGS. 2F-2H illustrate cross-sectional views of various embodiments of the spectrometer 200C of FIG. 2E along cross-section D-D.

In FIG. 2E, the spectrometer 200C has a plurality of light filters (e.g., 201A, 201B, or 201C) formed in or on a substrate 245. The substrate 245 may be any suitable substrate, such as a semiconductor substrate (e.g., silicon substrate). The light filters 201A/201B/201C are arranged in a matrix form in FIG. 2E as an example. In other embodiments, the light filters 201A/201B/201C may be arranged in an array format, or may include a single light filter.

FIG. 2F illustrates an embodiment cross-section view of the spectrometer 200C of FIG. 2E having light filters 201A. As illustrated in FIG. 2F, each of the light filter 201A has a plurality of layers, such as layers 237, 238, and 239. The layer 239 is formed on an underlying layer 247, which underlying layer 247 may comprise any suitable material, such as a semiconductor material or a dielectric material. The layer 237 is formed over the layer 239, and is attached to the substrate 245 by springs 241 (e.g., mechanical springs 241 attached to sidewalls of the layer 237). The layers 237 and 239 may be the same as or similar to the layers 231, 233, or 235 of the light filter 201 of FIG. 2D or may be the same as or similar to the layers 131, 133, or 135 of the light filter 101 of FIG. 1C, thus details are not repeated. The layer 238 of the light filter 201A is formed by a gas or a fluid, which gas or fluid is contained in a space 240 enclosed by the layers 237/239, the substrate 245, and MEMS arms 243. The MEMS arms 243 may be, e.g., piezoelectric (PZT) beams, or bi-metallic beams. The MEMS arms 243 may be actuated by, e.g., an electrical voltage applied to the MEMS arms 243 to move the layer 237 in various directions, such as up-and-down along the direction indicated by the arrow 253, or tilted to the left or right along the direction indicated by arrows 251. By adjusting the thickness of the layer 238 and the relative position of the layers 237 and 239, the optical characteristics of the light filter 201A is adjusted. In some embodiments, the optical characteristics of the light filter 201A are adjusted in real-time, e.g., by adjusting the position of the layer 237 in response to a control voltage applied to MEMS arms 243. In some embodiments, each of the light filter 201A is adjusted individually, e.g., by applying an individual control voltage to the MEMS arms 243 of each light filter 201A. The adjustment of each light filter 201A may be asynchronous (e.g., adjusted at different, independent time instants). In other embodiments, two or more filters 201A are adjusted by, e.g., a same control voltage applied to respective MEMS arms 243.

The design of light filters 201A in FIG. 2F illustrates an additional method (e.g., mechanical movement) to adjust the optical characteristics of the light filters, in additional to changing the properties of the electro-optic material(s) of the light filters as discussed with reference to FIG. 2D.

FIG. 2G illustrates another embodiment cross-section view of the spectrometer 200C of FIG. 2E having light filters 201B. The light filter 201B is similar to the light filter 201A of FIG. 2F, but with the shape of the space 240 (thus the shape of the layer 238) of the light filter 201B being different from that of the light filter 201A. In addition, the springs 241 may be replaced by another elastic structure, such as a membrane (e.g., a silicon membrane), that may seal the space 240. The layer 237 may be comprised in the membrane or may be formed over the membrane. Like reference numerals in FIGS. 2F and 2G refer to the same or similar components, thus details are not repeated.

FIG. 2H illustrates yet another embodiment cross-section view of the spectrometer 200C of FIG. 2E having light filters 201C. The light filter 201C includes a plurality of layers, such as layers 271, 273 and 275. The layers 271, 273 and 275 may be the same as or similar to the layers 131, 133, or 135 of the light filter 101 of FIG. 1C or the same as or similar to the layers 231, 233, or 235 of the light filter 201 of FIG. 2D, thus details are not repeated. As illustrated in FIG. 2H, the light filter 201C is supported by a movable beam 245C underneath, which movable beam 245C may be or include a MEMS arm such as a PZT beam, a bi-metallic beam, a capacitive actuation element, or a magnetic actuation element. The movable beam 245 may be controlled, e.g., by a control voltage, to tilt the light filter 201C to the left or to the right as indicated by the arrows 265. The angle between an upper surface 271U of each light filter 201C and the incident light (not shown) may be adjusted in real-time by, e.g., adjusting the movable beam 245C. An advantage of adjusting in real time the angle of incidence is, e.g., in case the incident light is polarized, the light intensity ratio between different polarization components is modulated, which gives additional information for spectral analysis. The number of light filters in the spectrometer 200C and the number of layers in the light filters 201A/201B/201C illustrated are for illustration purpose and not limiting. Other numbers of light filters and other numbers of layers in each of the light filters are also possible and are fully intended to be included within the scope of the present disclosure.

Figure 3:
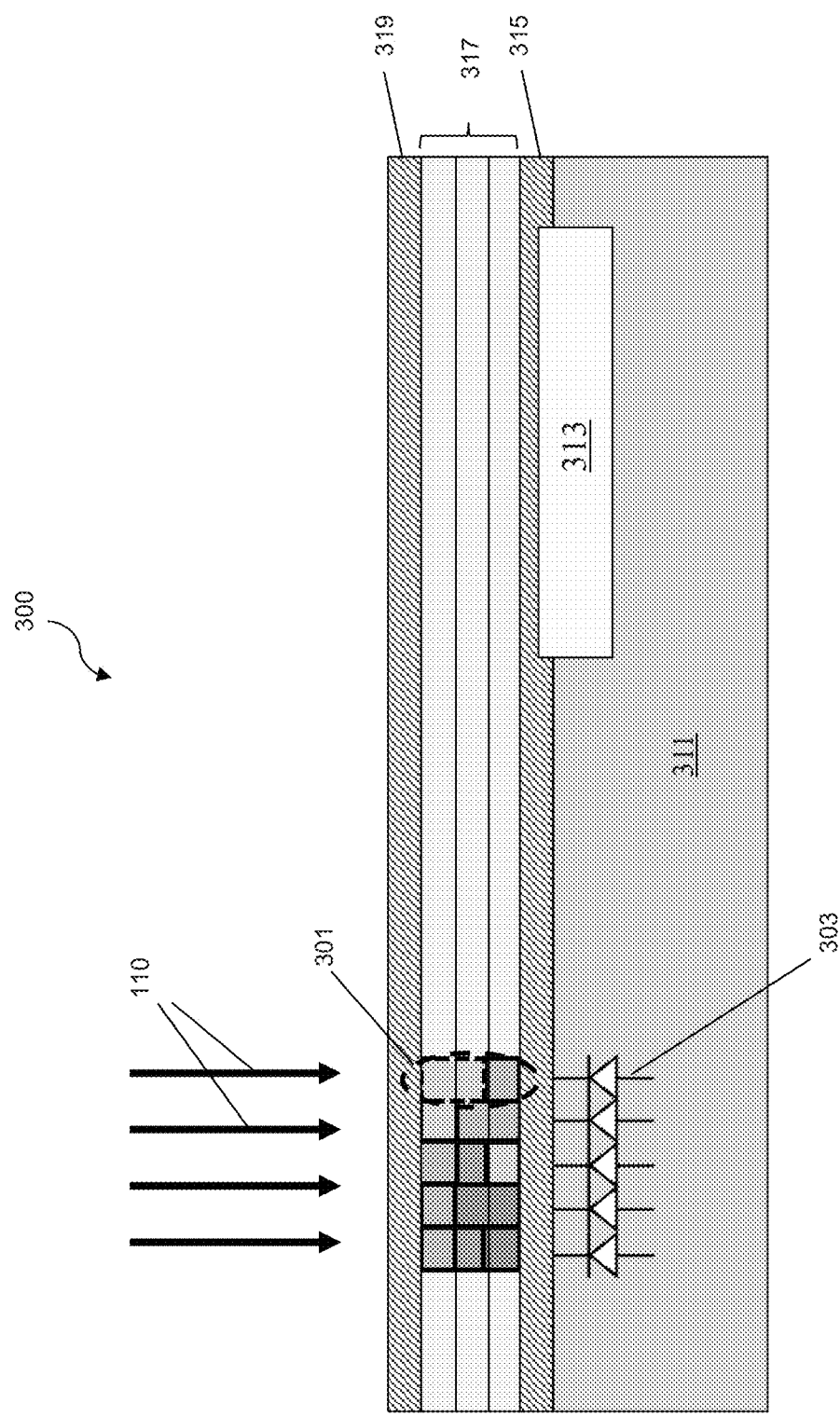
FIG. 3 illustrates a cross-sectional view of a spectrometer, in accordance with an embodiment.

FIG. 3 illustrates the cross-sectional view of a spectrometer 300. The spectrometer 300 includes a substrate 311, a plurality of light detectors 303 and a circuit 313 (e.g., an integrated circuit) formed in or on the substrate 311. The substrate 311 may include a semiconductor substrate, such as silicon, doped or undoped, or an active layer of a semiconductor-on-insulator (SOI) substrate. The semiconductor substrate 311 may include other semiconductor materials (e.g. germanium), a compound semiconductor (e.g. silicon carbide), an alloy semiconductor (e.g. SiGe), or a III-V semiconductor (e.g. gallium arsenide), or combinations thereof. Other substrates, such as multi-layered or gradient substrates, may also be used. Devices, such as transistors, diodes, capacitors, resistors, etc., may be formed in and/or on the semiconductor substrate 311 and may be interconnected by interconnect structures (not shown) formed by, for example, metallization patterns in one or more dielectric layers over the semiconductor substrate 311 to form the circuit 313.

The spectrometer 300 further includes a layer 315 over the substrate 311, which layer 315 comprises a suitable dielectric material such as silicon oxide, or the like. The layer 315 (or portions of the layer 315 between light detectors 303 and light filters 301) is transparent to the wavelengths of the light to be detected by the light detectors 303 of the spectrometer 300. A plurality of light filters 301 are formed in a plurality of layers 317 over (e.g., directly over) the light detectors 303. Each of the plurality of layers 317 may comprise silicon, a dielectric material, a polymer, or other suitable material. In some embodiments, the materials of the layers 317 are non-transparent (e.g., blocking) to at least the wavelengths of the light to be analyzed by the spectrometer 300, such that the wavelengths of the light to be analyzed only reach the light detectors 303 through the light filters 301. A layer 319, which may comprise a same material as the layer 315, is formed over the light filters 301 and the layers 317. The layer 319 is transparent to the wavelengths of the light to be analyzed by the spectrometer 300, at least in the portion where the light passes through.

In FIG. 3, each light filter 301 has a corresponding light detector 303, such that the light transmitted through each light filter 301 is detected by a respective underlying light detector 303. The light filter 301 may be the same or similar to the light filter 101 in FIG. 1C, or the light filter 201 in FIG. 2D. For example, each of the light filters 301 may comprise an electro-optic material that is adjustable by a control parameter (e.g., voltage, or temperature), similar to the light filter 201. The light detector 303 may be, e.g., a photo diode, or other suitable detector for detecting light.

In some embodiments, the circuit 313 manages the light detectors 303 and adjusts the optical characteristics (e.g., transmitted wavelength, or reflected wavelengths) of each of the light filter 301. For example, electrical conductive paths (e.g., conductive lines and vias, not shown in FIG. 3) are formed in the substrate 311 and in the layers (e.g., 315, 317, 319) over the substrate 311 to electrically connect the circuit 313 with each of the light filter 301 and each of the light detectors 303. In some embodiments, the circuit 313 adjusts, e.g., the voltage, or the temperature of each of the light filters 301, such that the transmitted wavelength of each light filter 301 changes over time to achieve temporal wavelength dispersion. In some embodiments, the circuit 313 receives the output of the light detectors 303, and performs certain processing, such as data formatting and/or pre-processing of the output of the light detector 303. Data formatting may include changing the format of the light detector output from a first format (e.g., a raw data format) to a second format (e.g., two's complementary format) suitable for subsequent processing. Pre-processing may include pre-filtering, such as low-pass filtering or band-pass filtering the output of the light detectors 303 to remove out-of-band noises and to improve signal quality, as examples. In addition, the circuit 313 may perform any other suitable functions.

The number of light filters 301, the number of light detectors 303, as well as the number of layers (e.g., 315, 317, 319) illustrated in FIG. 3 are for illustrated purpose only and not limiting. Other numbers are also possible and are fully intended to be included within the scope of the present disclosure.

Figure 4:
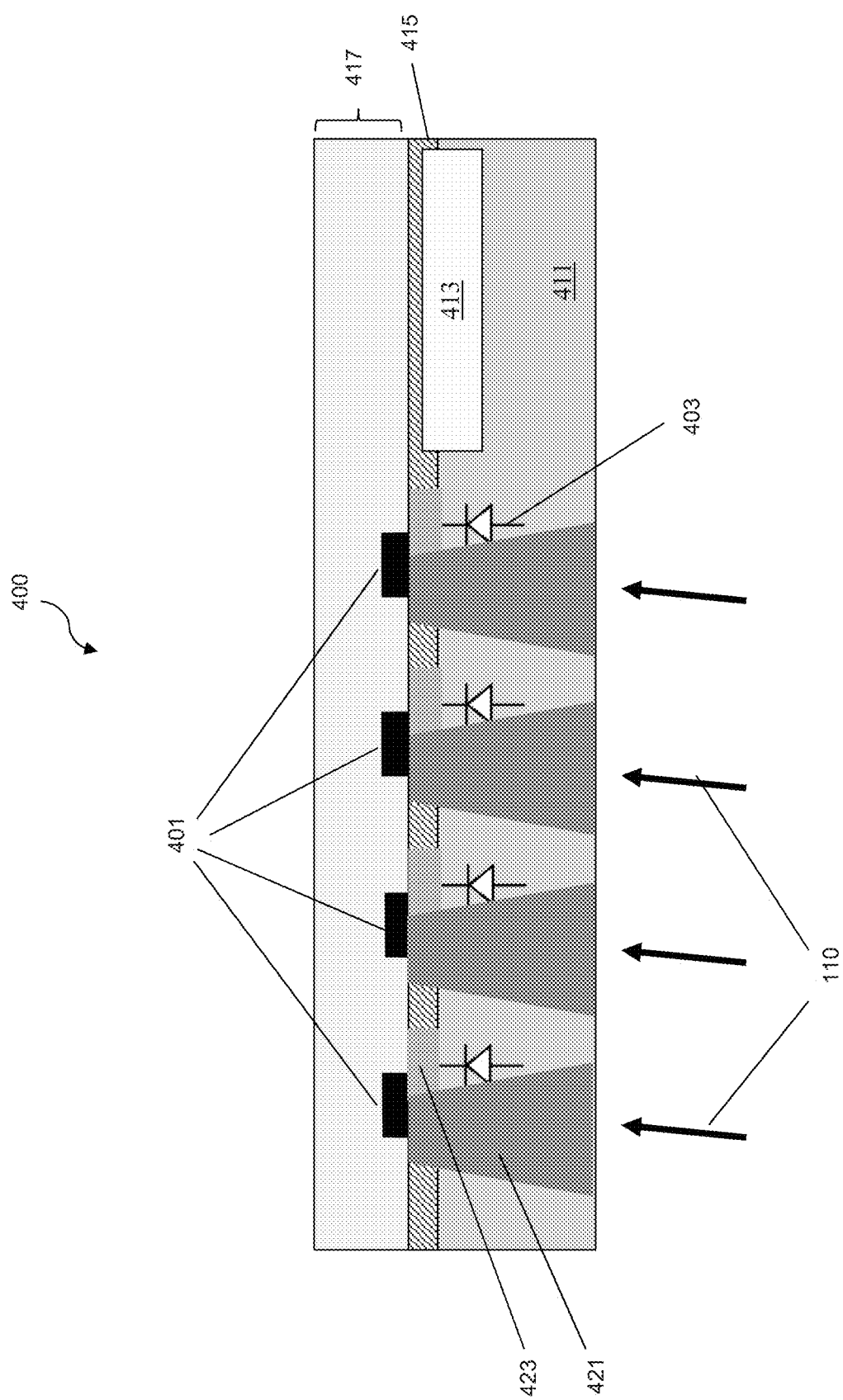
FIG. 4 illustrates a cross-sectional view of a spectrometer, in accordance with an embodiment.

FIG. 4 illustrates the cross-sectional view of a spectrometer 400. Unlike the spectrometer 300 in FIG. 3, which detects lights passing through the light filters 301, the detector 403 detects light reflected by the light filters 401. While the light filter 101 in FIG. 1C and the light filter 201 in FIG. 2D are discussed in the context of detecting the transmitted light through the light filter, one skilled in the art would readily appreciate that it is possible to apply the same principle discussed above to design the light filter 101 or 201, such that the wavelengths of interest are reflected by the light filter 101 or 201 for detection by the light detectors. In other words, instead of detecting the transmitted light (where the light filter is optimized for transmission operation) from each of the light filters (e.g., 101, 201), the spectrometer may detect the reflected light (may also be referred to as a reflected optical signal) from each of the light filters (where the light filter is optimized for reflection operation). Each of the light filters 401 in FIG. 4, therefore, may have a same or similar structure as the light filters 101 in FIG. 1C or 201 in FIG. 2D, and are designed to reflect a light component with a wavelength different from the wavelength of the reflected light of other light filters 401.

As illustrated in FIG. 4, a plurality of light detectors 403 and a circuit 413 are formed in/on a substrate 411. The substrate 411, the light detectors 403, and the circuit 413 may be the same or similar to the substrate 311, the light detectors 303, and the circuit 313 of FIG. 3, respectively, thus details may not be repeated. The light detectors 403 may be, e.g., a photo diode, or any suitable detector for detecting light. For example, the light detector 403 may use the optoelectronic device with a V-shaped recess for detecting electromagnetic radiation disclosed in U. S. Patent Publication No. 2014/0001521 A1, which patent publication is incorporated herein by reference. Note that for simplicity, the electrical connections (e.g., conductive lines such as copper lines) between the circuit 413 and the light filters 401, and between the circuit 413 and the light detectors 403, are not shown.

Still referring to FIG. 4, a layer 415, which may be a dielectric layer, is formed over the substrate 411, the light detectors 403 and the circuit 413. The layer 415 is formed of a material that is non-transparent to (e.g., blocking) the light (e.g., incident light 110 and the reflected light) to be analyzed and may thus be referred as a non-transparent layer. In addition, a plurality of light filters 401 are formed over the layer 415 in one or more layer 417. The one or more layers 417 may comprise any suitable material, e.g., dielectric material such as silicon oxide, silicon nitride, or polymer. Each of the light filters 401 may include at least one electro-optic material such that the optical characteristics (e.g., the wavelength(s) of the reflected light) of the light filter 401 are adjustable through at least one control parameter (e.g., voltage, or temperature).

FIG. 4 further illustrates transparent regions 421 which extend through the substrate 411, through the layer 415, and to the light filters 401. The transparent regions 421 are transparent to (e.g., pass through) the incident light 110. FIG. 4 also illustrates transparent regions 423 extending through the layer 415 and disposed between the light filters 401 and the light detectors 403. Each of the transparent regions 421 is disposed close to a respective transparent region 423, and both the transparent regions 421 and the respective transparent region 423 are adjacent to (e.g., in physical contact with) a respective light filters 401, as illustrated in FIG. 4. In some embodiments, the incident light 110 passes through the transparent regions 421 to reach the light filters 401, and the reflected lights (not shown) from the light filters 401 travel through the transparent regions 423 to reach the light detectors 403.

In some embodiments, the transparent regions 421 and the transparent regions 423 are formed of a same material. In some embodiments, the transparent regions 421 and the transparent regions 423 are formed of different materials. In particular, the transparent regions 421 may comprise a material(s) that passes through all light components (e.g., all wavelengths) of the incident light 110, while each of the transparent regions 423 may comprise a material(s) that only passes through the reflected light (e.g., reflected wavelength(s)) from a corresponding light filter 401. In other words, each of the transparent regions 423 may pass through a wavelength (or a plurality of wavelengths) different from the wavelength(s) of other transparent regions 423. The wavelength to be transmitted in regions 423 may be controlled by using an electro-optic material for the transparent regions 423, and by applying different control parameters (e.g., voltage, or temperature) to different transparent regions 423.

In some embodiments, the transparent regions 421 comprise an electro-optic material. By adjusting the optical characteristics (e.g., refractive index) of the electro-optic material of the transparent regions 421, the angle of incidence of the light 110 on the light filters 401 are adjusted. Similarly, the angle of incidence of the reflected light on the light detectors 403 may be adjusted by adjusting the optical characteristics (e.g., refractive index) of the electro-optic material of the transparent regions 423. For example, the voltage, or the temperature of the electro-optic material of the transparent regions 421 (or 423) may be adjusted to achieve the target refractive index. An advantage of adjusting in real time the angle of incidence is, e.g., in case the incident light is polarized, the light intensity ratio between different polarization components is modulated, which gives additional information for spectral analysis.

FIG. 5A illustrates the cross-sectional view of a spectrometer 500. The spectrometer 500 is similar to the spectrometer 400 of FIG. 4, but with different light filters 501. As illustrated in FIG. 5A, the spectrometer 500 has a substrate 511, light detectors 503, circuit 513, transparent regions 521, transparent regions 523, and non-transparent layers 515, which are the same as or similar to the substrate 411, light detectors 403, circuit 413, transparent regions 421, transparent regions 423, and non-transparent layers 415 of FIG. 4, respectively, thus details are not repeated. Note that for simplicity, the electrical connections (e.g., conductive material) between the circuit 513 and the light filters 501, and between the circuit 513 and the light detectors 503, are not shown.

FIG. 5A further illustrates a transparent layer 517 on the non-transparent layer 515. The light filters 501 are formed in one or more layer 519, which may be the same or similar to the layer 417 of FIG. 4, or may be the same or similar to the layer 511. The light filters 501 may extend partially into the transparent layer 517. As illustrated in FIG. 5A, the incident light 110 travels through the transparent regions 521 to reach light filters 501 (see FIG. 5B for more details), and the light reflected by the light filters 501 travels through the transparent regions 523 to reach the light detectors 503.

FIG. 5B illustrates a cross-sectional view showing details of the light filter 501 of FIG. 5A. Unlike the light filters (e.g., 301, 401) discussed above, the light filter 501 comprises V-shaped layers (e.g., 541, 543). Although not shown, other suitable shapes, e.g., U-shape, or semispherical shape, may also be used for the layers (e.g., 541, 543). The layers 541 and 543 of the light filter 501 may comprise the same or similar materials as the layers of the light filter 101 in FIG. 1C or the layers of the light filter 201 in FIG. 2D. In some embodiments, at least one of the layers 541 and 543 comprises an electro-optic material, such that the optical characteristics (e.g., reflected wavelength(s)) of the light filter 501 is adjustable through a control parameter (e.g., voltage, or temperature). The number of layers of the light filter 501 illustrated in FIG. 5B is merely an example, other numbers of layers are also possible and are fully intended to be included within the scope of the present disclosure.

FIG. 5B further shows a transparent region 545 of the light filter 501, which transparent region 545 fills a V-shaped (or other suitable shape such as U-shaped, or semispherical shaped) recess between the intersecting segments of the layers 541/543. The transparent region 545 is formed of a material that is transparent to the incident light 110. In some embodiments, the light filter 501 comprises an electro-optic material. By adjusting the optical characteristics of the electro-optic material (e.g., by changing the voltage, or the temperature of the electro-optic material), the filtered wavelength can be adjusted. In other embodiments, the transparent region 545 is an electro-optical material, and the angle of incidence of the incident light 110 on the light filter 501 is adjusted to a target value by controlling, e.g., the voltage or the temperature of the electro-optical material. The light filter 501 with the V-shaped recess may advantageously increase the detection efficiency, and may also achieve better wavelength selection. Another advantage of adjusting in real time the angle of incidence is, e.g., in case the incident light is polarized, the light intensity ratio between different polarization components is modulated, which gives additional information for spectral analysis.

Figure 6:
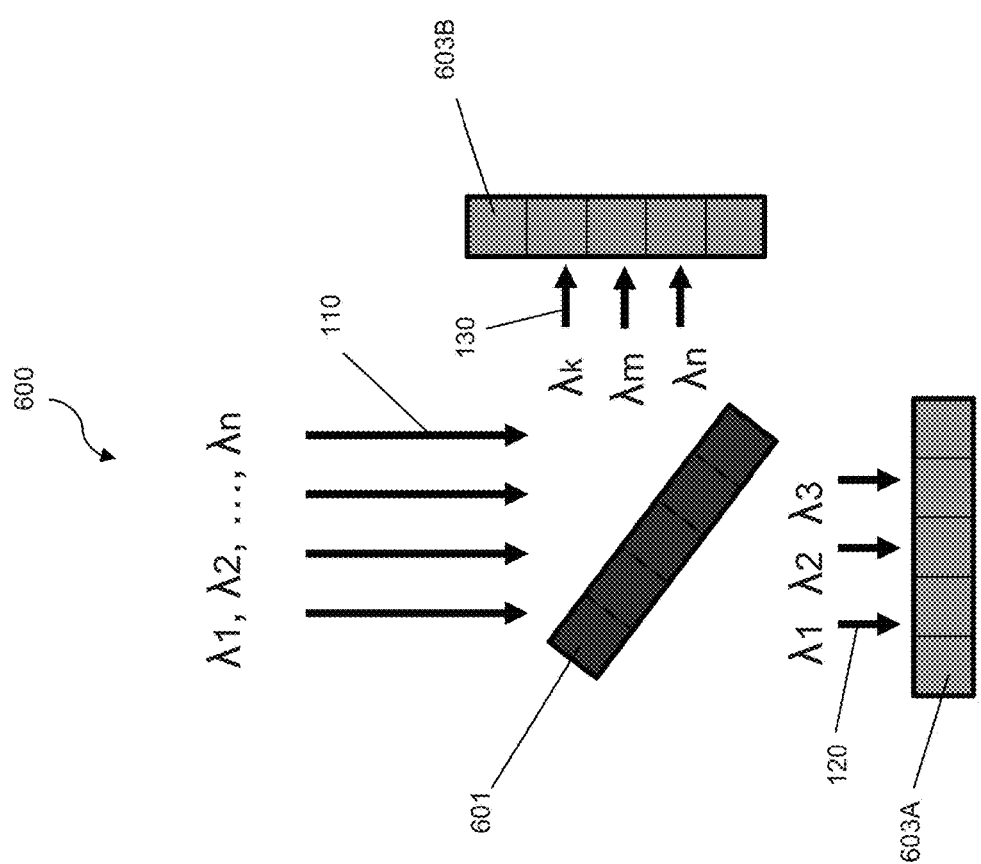
FIG. 6 illustrates a cross-sectional view of a spectrometer, in accordance with an embodiment.

FIG. 6 illustrates the cross-sectional view of a spectrometer 600. Note that for clarity, not all elements of the spectrometer 600 are illustrated. The spectrometer 600 improves the detection efficiencies by detecting both the transmitted light and the reflected light. The spectrometer 600 includes light filters 601 and light detectors 603A and 603B. As illustrated in FIG. 6, the light 110, which includes light components having a plurality of wavelengths, impinges on the light filters 601. In the illustrated example, each of the light filters 601 transmits (e.g., passes, or lets through) a different wavelength(s), and reflects another different wavelength(s). The transmitted light 120 is detected by a respective light detector 603A, and the reflected light 130 is detected by a respective light detector 603B.

One skilled in the art will readily appreciate that the principles discussed above regarding light filters, e.g., 101, 201, and 401, may be used to form the light filter 601. Therefore, the spectrometer 600 is a combination of the transmission type spectrometer (e.g., 100, 200, and 300) and the reflection type spectrometers (e.g., 400 and 500), and may be referred to as a transmission-and-reflection type spectrometer. The various structures and combinations of materials for the various light filters (e.g., 101, 201, 401) discussed above can be readily used to form the light filters 601. For example, the light filters 601 may be formed in a matrix form (see, e.g., FIG. 1A) to achieve spatial wavelength dispersion. As another example, each of the light filters 601 may comprise an electro-optic material such that the optical characteristics (e.g., reflected wavelength(s) and transmitted wavelength(s)) of the light filter 601 can be adjusted by a control parameter (e.g., the voltage, or the temperature of the electro-optic material) to achieve temporal wavelength dispersion. In embodiments where temporal wavelength dispersion is used, trade-off between speed and size can be made, and therefore, the spectrometer 600 may comprise light filters 601 formed in an array (see, e.g., FIG. 2B) to achieve small form factor. In an embodiment, the spectrometer 600 comprises a single light filter 601 to achieve even smaller form factor.

Figure 7:
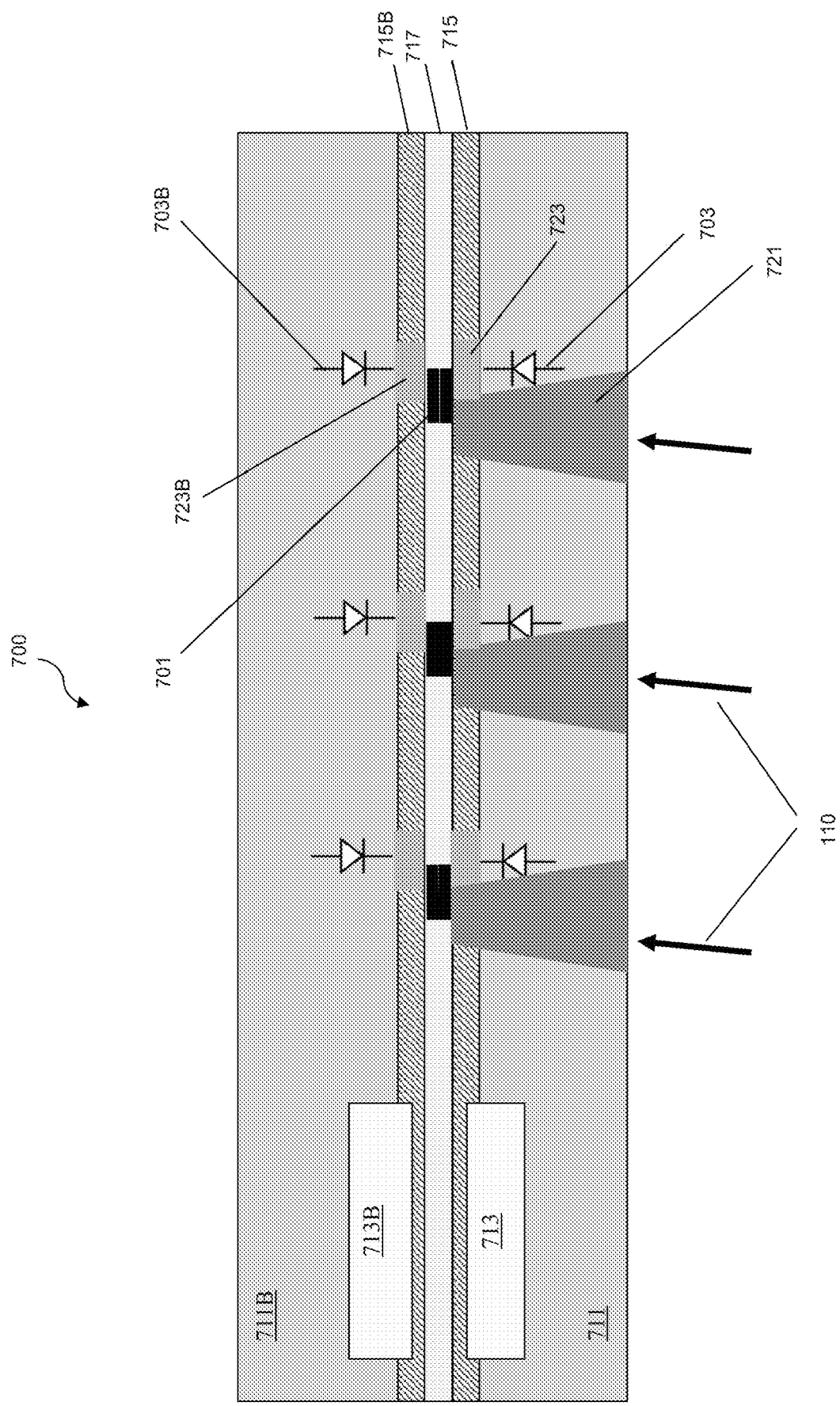
FIG. 7 illustrates a cross-sectional view of a spectrometer, in accordance with an embodiment.

FIG. 7 illustrates a transmission-and-reflection type spectrometer 700. The substrate 711, light detectors 703, circuit 713, light filters 701, transparent regions 721/723, non-transparent layer 715 (e.g., non-transparent to the incident light 110), and layer 717 form a reflection-type spectrometer similar to the spectrometer 400 in FIG. 4. Like reference numerals in FIG. 7 refer to like elements in FIG. 4, thus details are not repeated here. For example, substrate 711 in FIG. 7 is formed of a same or similar material as the substrate 411 in FIG. 4.

FIG. 7 further illustrates non-transparent layer 715B, light detectors 703B, transparent regions 723B, substrate 711B, and circuit 713B. The non-transparent layer 715B, the light detectors 703B, the substrate 711B, and the circuit 713B may be the same or similar to the non-transparent layer 715, the light detectors 703, the substrate 711, and the circuit 713, thus details are not repeated. In some embodiments, the transparent regions 721, 723 and 723B are formed of a same material, e.g., a material transparent to (passing through all wavelengths of) the incident light 110. In some embodiments, the transparent regions 721 is formed of a material transparent to the incident light 110, while each of the transparent regions 723 is formed of a material transparent to the reflected light of a respective light filter 701, and each of the transparent regions 723B is formed of a material transparent to the transmitted light of a respective light filter 701.

Figure 8A:
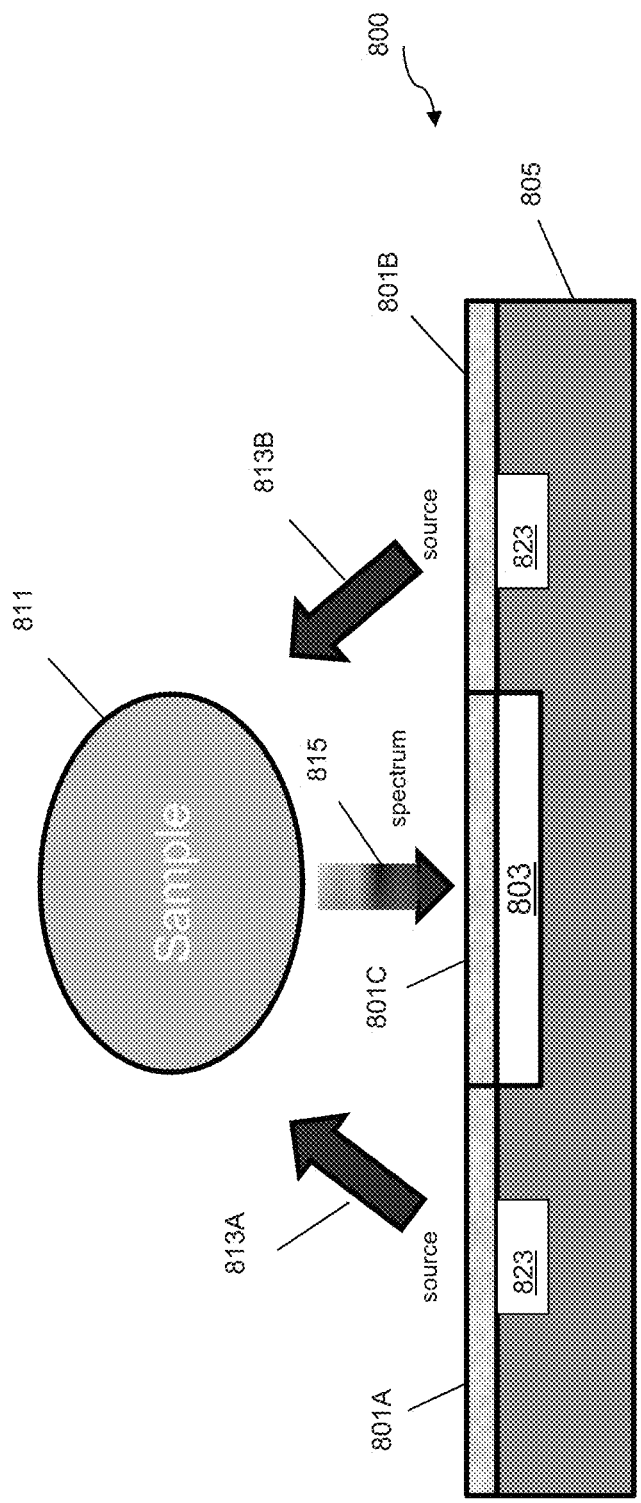
FIGS. 8A and 8B illustrate cross-sectional views of a device with an integrated spectrometer, in accordance with an embodiment.

FIG. 8A illustrates a cross-sectional view of a device 800 having an integrated spectrometer 803. The device 800 may be a digital mobile device, such as a smart phone, a tablet, a hand-held medical device, or the like. FIG. 8A further illustrates the analysis of a sample 811 using the device 800 with the integrated spectrometer 803. As illustrated in FIG. 8A, the device 800 has a housing 805 and a screen 801, which screen 801 may comprise screen portions 801A, 801B, and 801C. The screen 801 may be, e.g., a liquid crystal screen. The integrated spectrometer 803 may be any suitable spectrometer, such as the spectrometer 300, 400, 500, 700 disclosed above, or the spectrometer 900, 1000, 1100, 1200, or 1200A disclosed hereinafter.

To analyze the sample 811 using the spectrometer 803, the device 800 transmits (e.g., sends out) light 813A and light 813B through the screen portion 801A and screen portion 801B, respectively, toward the sample 811. The lights 813A/813B may be generated by sources 823 of the device 800. The lights 813A/813B may be monochromatic, or may be non-monochromatic (e.g., comprising light components with a plurality of wavelengths). In some embodiments, the lights 813A and 813B are the same (e.g., having the same wavelength(s)). In some embodiments, the light 813A is different (e.g., having different wavelengths) from the light 813B. The reflected light 815 travels through the screen portion 801C to arrive at the spectrometer 803. The spectrometer 803 analyzes the sample 811 by analyzing the reflected light 815.

Figure 8B:
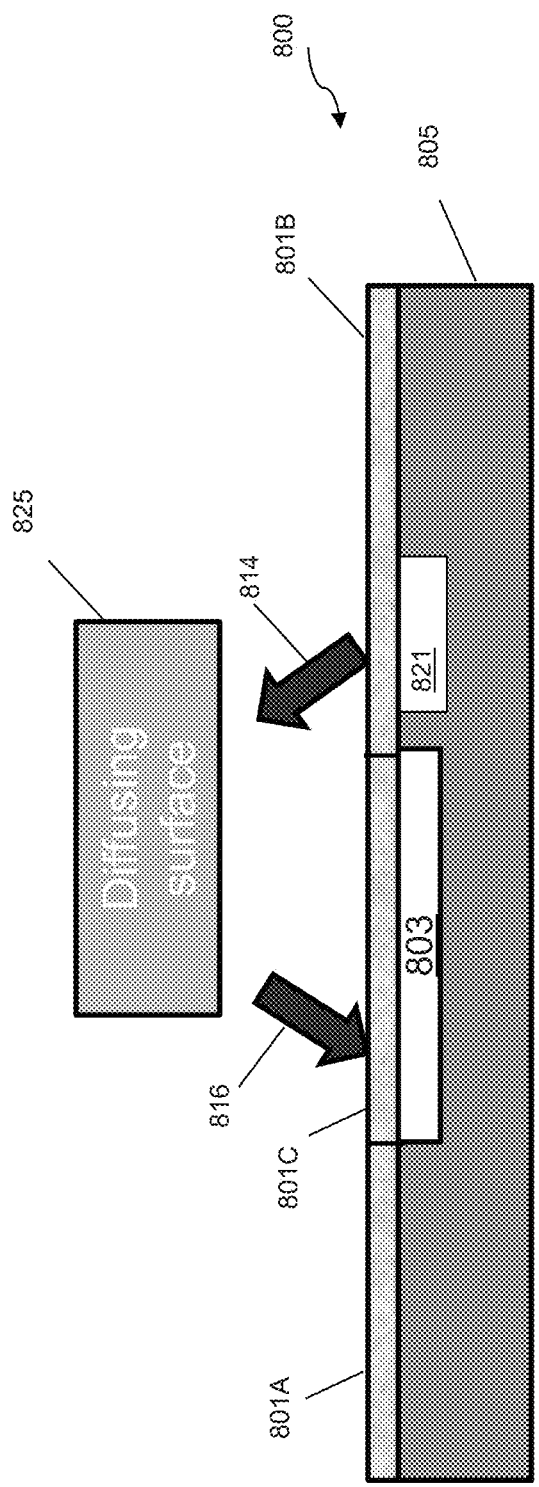

FIG. 8B illustrates the calibration process for the spectrometer 803 of the device 800. To calibrate the spectrometer 803, a calibration source 821 of the device 800 transmits (e.g., sends out) a light 814 with a known spectrum (e.g., a plurality of known wavelengths). The light 814 impinges on a diffusing surface 825 and the reflected light 816 travels through the screen portion 801C to reach the spectrometer 803. The diffusing surface 825 may be, e.g., a white surface that reflects light 814 without changing its spectrum contents (e.g., wavelengths). The diffusing surface 825 diffuses the light 814 in different direction (e.g., isotropically), in some embodiments. The output of the spectrometer 803 is then compared with the known spectrum of the light 814 for the calibration process.

Figure 9:
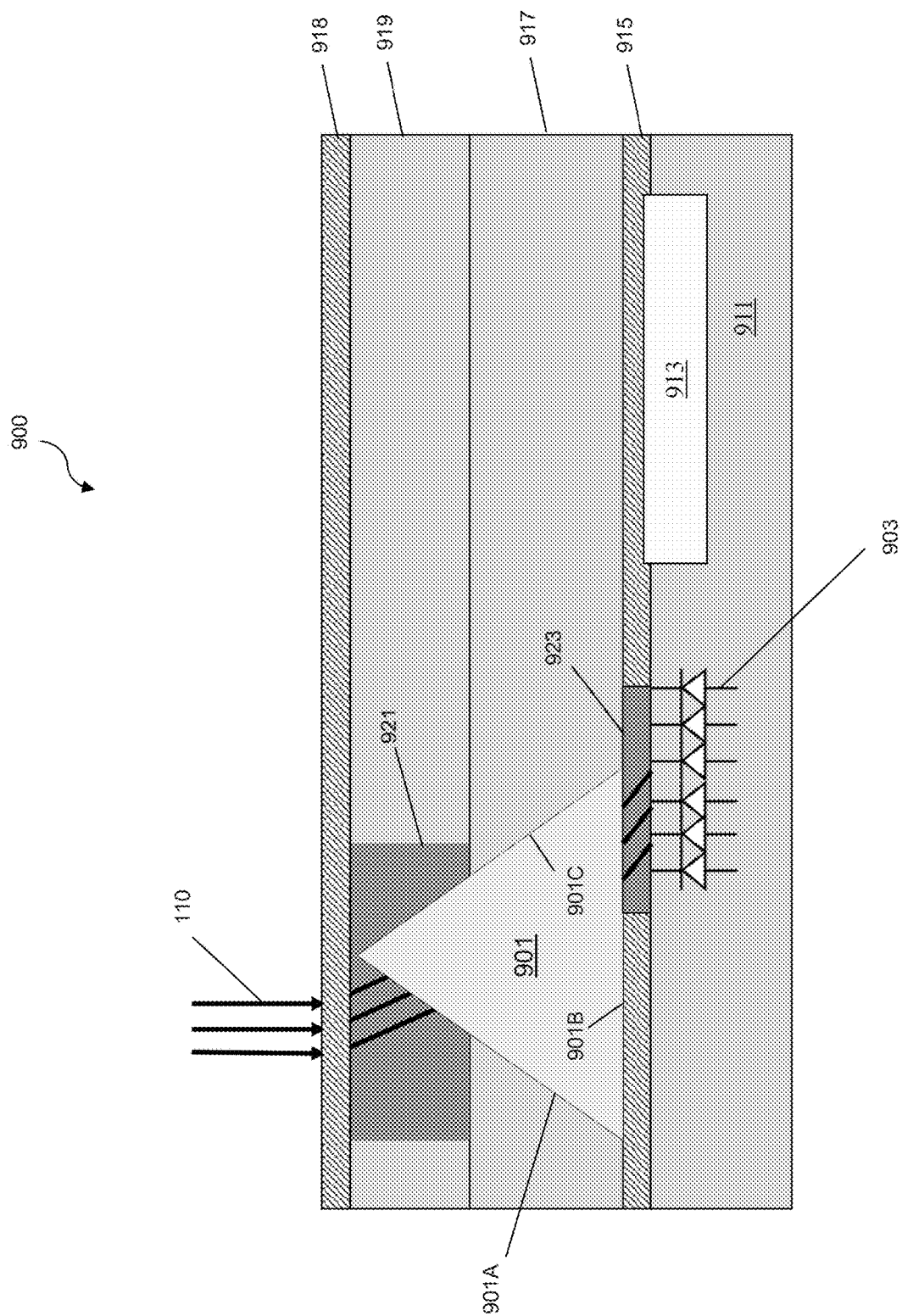
FIG. 9 illustrates a cross-sectional view of a spectrometer, in accordance with an embodiment.
Figure 10:
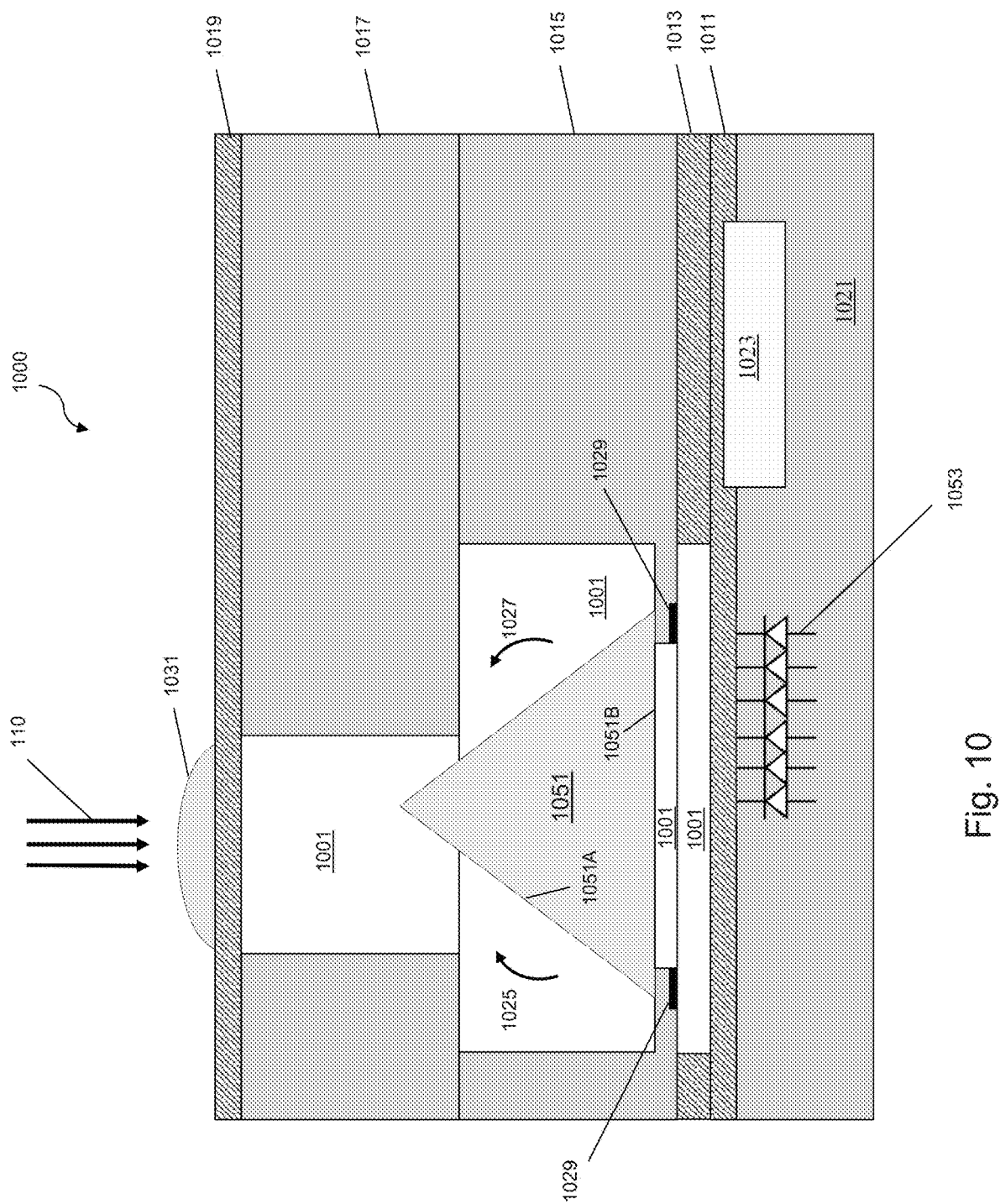
FIG. 10 illustrates a cross-sectional view of a spectrometer, in accordance with an embodiment.
Figure 11:
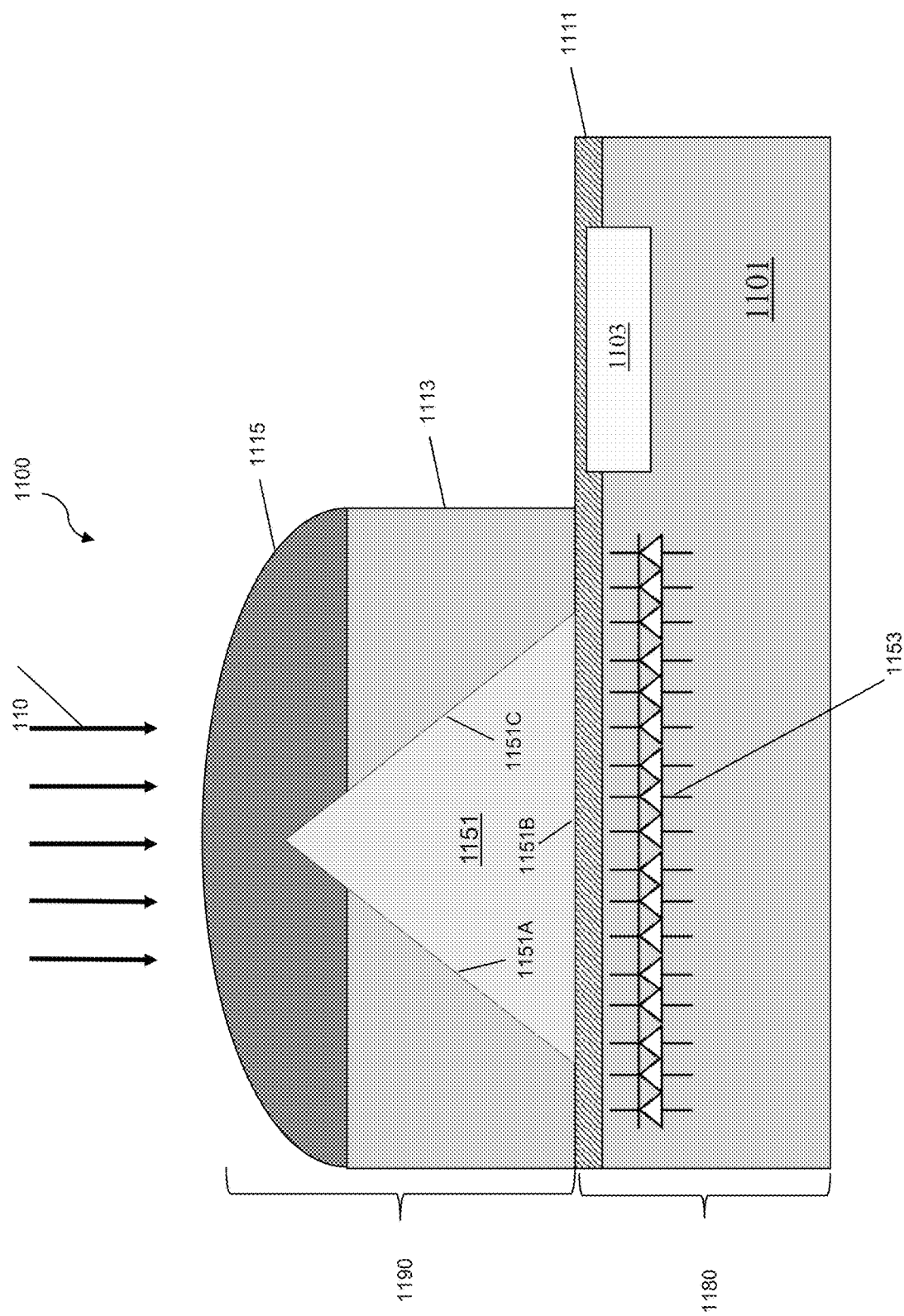
FIG. 11 illustrates a cross-sectional view of a spectrometer, in accordance with an embodiment.

FIGS. 9-11 illustrates cross-sectional views of various embodiments of spectrometers using a prism. FIG. 9 illustrates a spectrometer 900 having a substrate 911, light detectors 903, a circuit 913, and a non-transparent layer 915. The substrate 911, the light detectors 903, the circuit 913, and the non-transparent layer 915 are the same or similar to the substrate 411, light detectors 403, circuit 413, and the non-transparent layer 415 of FIG. 4, respectively, thus details are not repeated.

FIG. 9 further illustrates a transparent region 923 extending from an upper side of the non-transparent layer 915 to a lower side of the non-transparent layer 915. The transparent region 923 is formed of a material that is transparent to the incident light 110, in the illustrated embodiment. Layers 917 and 919, each of which may comprise a suitable material such as silicon, ceramic, or plastic, are over the non-transparent layer 915 and may each be referred to as a substrate. In some embodiments, the layers 917 and 919 are the same substrate wafer (e.g., formed of a same material). A prism 901 is embedded in the substrate 917 and 919. A transparent region 921, formed of a material that is transparent to the incident light 110, extends from an upper side of the substrate 919 to a lower side of the substrate 919, in the illustrated embodiment. A top portion of the prism 901 is in the transparent region 921. A bottom surface 901B of the prism 901 at least partially overlaps with the transparent region 923. A transparent layer 918, transparent to the incident light 110, is formed over the substrate 919. The layer 918 may be formed in such a way that portions of the layer 918 outside the light path are formed of a material that is not transparent to the incident light 110.

In some embodiments, the substrate 917 and 919 are non-transparent to the light 110. Therefore, the light 110 enters the prism 901 from top portions of the prism 901 disposed in the transparent region 921. As illustrated in FIG. 9, the light 110 travels through the transparent layer 918 and the transparent region 921, enters the prism 901 through top portions of a surface 901A of the prism 901 in the transparent region 921, gets refracted by the prism 901, exits the prism 901 at the bottom surface 901B of the prism 901, and travels through the transparent region 923 to reach the light detectors 903. Due to the prism 901, the light 110 is refracted and forms a spectrum of light with different wavelengths after exiting the prism 901. The light detectors 903 may therefore each detect a different wavelength of the spectrum.

In another embodiment, portions of the light 110 may also enter the prism 901 through top portions of a surface 901C of the prism 901 in the transparent region 921. These portions of the light 110, after being refracted by the prism 901, exit the prism 901 and passes through the transparent region 923 to be detected by the detector 903. In this case, the lateral size and the location of the transparent region 923, and the location of the detectors 903, may be adjusted to be in the path of the refracted light (not shown in FIG. 9).

In some embodiments, the substrate 911, the light detectors 903, the circuit 913, the non-transparent layer 915, and the transparent region 923 are formed in a first semiconductor device (e.g., an integrated circuit (IC)), whereas the prism 901, the layers 917/919/918, and the transparent region 921 are formed in a second semiconductor device (e.g., an optical IC). Once formed, the second semiconductor device is attached to the first semiconductor device as illustrated in FIG. 9 to form the spectrometer 900. Other methods to form the spectrometer 900 are possible and are fully intended to be included within the scope of the present disclosure.

In some embodiments, the prism 901 is formed of an optical material transparent to the incident light 110, and the optical characteristics of the prism 901 are not configured to be adjustable. In other embodiments, the prism 901 comprises an electro-optic material such that the optical characteristics of the prism 901 are adjustable by a control parameter, e.g., an electrical voltage applied to the electro-optic material, or a temperature of the electro-optic material. In the illustrated embodiments, the circuit 913 applies an electrical voltage to the electro-optic material of the prism 901 to change at least one of the optical characteristics of the prism 901.

FIG. 10 illustrates a cross-sectional view of a spectrometer 1000 having a prism 1051. The spectrometer 1000 has a substrate 1021, light detectors 1053, and a circuit 1023. The substrate 1021, the light detectors 1053, and the circuit 1023 are the same or similar to the substrate 411, the light detectors 403, and the circuit 413 of FIG. 4, respectively, thus details are not repeated. The spectrometer 1000 further has a transparent layer 1011 over the substrate 1021 and over the light detectors 1053. In addition, a plurality of layers, such as 1013, 1015, 1017 and 1019 are over the transparent layer 1011, and may each be referred to as a substrate. The layer 1019 is formed of a material that is transparent to the incident light 110 (at least in the region below the lens 1031 and in the light path), and the layer 1013 may be formed of one or more materials that may be non-transparent to the incident light 110, in some embodiments.

As illustrated in FIG. 10, openings 1001 (e.g., empty spaces) are formed in the layer 1013, the substrate 1015, and the substrate 1017. The prism 1051 is disposed in the openings 1001. The prism 1051 may comprise a same or similar material as the prism 901 of FIG. 9, thus details are not repeated. The shape and the location of the prism 1051, together with the shapes and the locations of the openings 1001, are designed to allow the light 110 to enter the prism 1051 from the left surface 1051A of the prism 1051 and to exit the prism 1051 from the bottom surface 1051B of the prism 1051. An optional lens 1031 is formed over the openings 1001 and the layer 1019 to help focus the incident light 110 on the prism 1051.

FIG. 10 further illustrates movable MEMS arms 1029 under the prism 1051. The movable MEMS arms 1029 may be, e.g., piezoelectric (PZT) beams, or bi-metallic beams such that the movable MEMS arms 1029 may be controlled by the circuit 1023 to adjust the position (e.g., rotate) of the prism 1051, e.g., rotate along the direction 1025 or 1027. Therefore, the movable MEMS arms 1029 may be used to adjust the angle of incidence of the incident light 110. In some embodiments, the prism 1051 comprises an electro-optic material, and the circuit 1023 adjusts the optical characteristics of the prism 1051 by adjusting, e.g., a voltage applied to the electro-optic material, or a temperature of the electro-optic material. In some embodiments, the propagation angle of the light 110 in the prism 1051 is changed by changing the refractive index of the electro-optic material of the prism 1051. Note that for simplicity, electrical connections between the circuit 1023 and other electrical components, such as light detectors 1053, the movable MEMS arms 1029, and the electro-optic material of the prism 1051 (if any), are not shown in FIG. 10.

FIG. 11 illustrates a cross-sectional view of a spectrometer 1100 having a prism 1151. The spectrometer 1100 has a substrate 1101, light detectors 1153, a circuit 1103, and a transparent layer 1111. The substrate 1101, the light detectors 1153, the circuit 1103, and the transparent layer 1111 are the same or similar to the substrate 311, the light detectors 303, the circuit 313, and the transparent layer 315 of FIG. 3, respectively, thus details are not repeated.

The spectrometer 1100 further has a prism 1151 in a substrate 1113, placed over the transparent layer 1111. The prism 1151 is partially embedded in the substrate 1113, and a top portion of the prism 1151 is disposed above an upper surface of the substrate 1113. The substrate 1113 (e.g., silicon) may be non-transparent to the incident light 110, and therefore, the light 110 enters the prism 1151 through top portions of a surface 1151A and top portions of a surface 1151C of the prism 1151, where the top portions of 1151A and the top portions of 1151C are disposed above the upper surface of the substrate 1113. An optional lens 1115 is formed over the prism, which optional lens 1115 helps to focus the light 110 on the prism 1151. In embodiments where the optional lens 1115 is not formed, a transparent layer may be formed over the prism 1151 and over the substrate 1113 to protect the prism 1151.

The prism 1151 is formed of an optical material. In some embodiments, the prism 1151 comprises an electro-optic material such that the optical characteristics of the prism 1151 can be adjusted. Details are the same or similar to the prism 1051 of FIG. 10 or the prism 901 of FIG. 9, thus are not repeated. Note that in FIG. 10, the incident light 110 enters the prism 1051 from one surface of the prism (e.g., 1051A in FIG. 10). In contrast, in FIG. 11, the incident light 110 enters the prism 1151 from top portions of two surfaces 1151A and 1151C. For this reason, the light detectors 1153 are positioned symmetrically about a vertical center axis (not shown) of the prism 1151 in FIG. 11. In FIG. 10, the light detectors 1053 are position non-symmetrically about a vertical center axis of the prism 1051 (e.g., positioned on one side of the vertical center axis). In FIG. 9, since only portions of the light 110 entering the prism from the top portions of the surface 901A pass through the transparent region 923, the light detectors 903 are also positioned non-symmetrically about a vertical center axis of the prism 901 (e.g., positioned on one side of the vertical center axis). The prisms 901, 1051 and 1151 in FIGS. 9, 10 and 11 are illustrated to have a triangular shape as non-limiting examples. In other embodiments (not shown), the prism (e.g., 901, 1051, and 1151) may have other suitable shape such as a trapezoidal shape, a polygonal shape, or the like.

In some embodiments, the substrate 1101, the light detectors 1153, the circuit 1103, and the transparent layer 1111 are formed in a first IC 1180, whereas the layers and components above the transparent layer 1111 are formed in a second semiconductor device 1190 (e.g., an optical IC). Once formed, the second semiconductor device 1190 is attached to the first semiconductor device 1180 to form the spectrometer 1100. Other methods to form the spectrometer 1100 are possible and are fully intended to be included within the scope of the present disclosure.

Figure 12A:
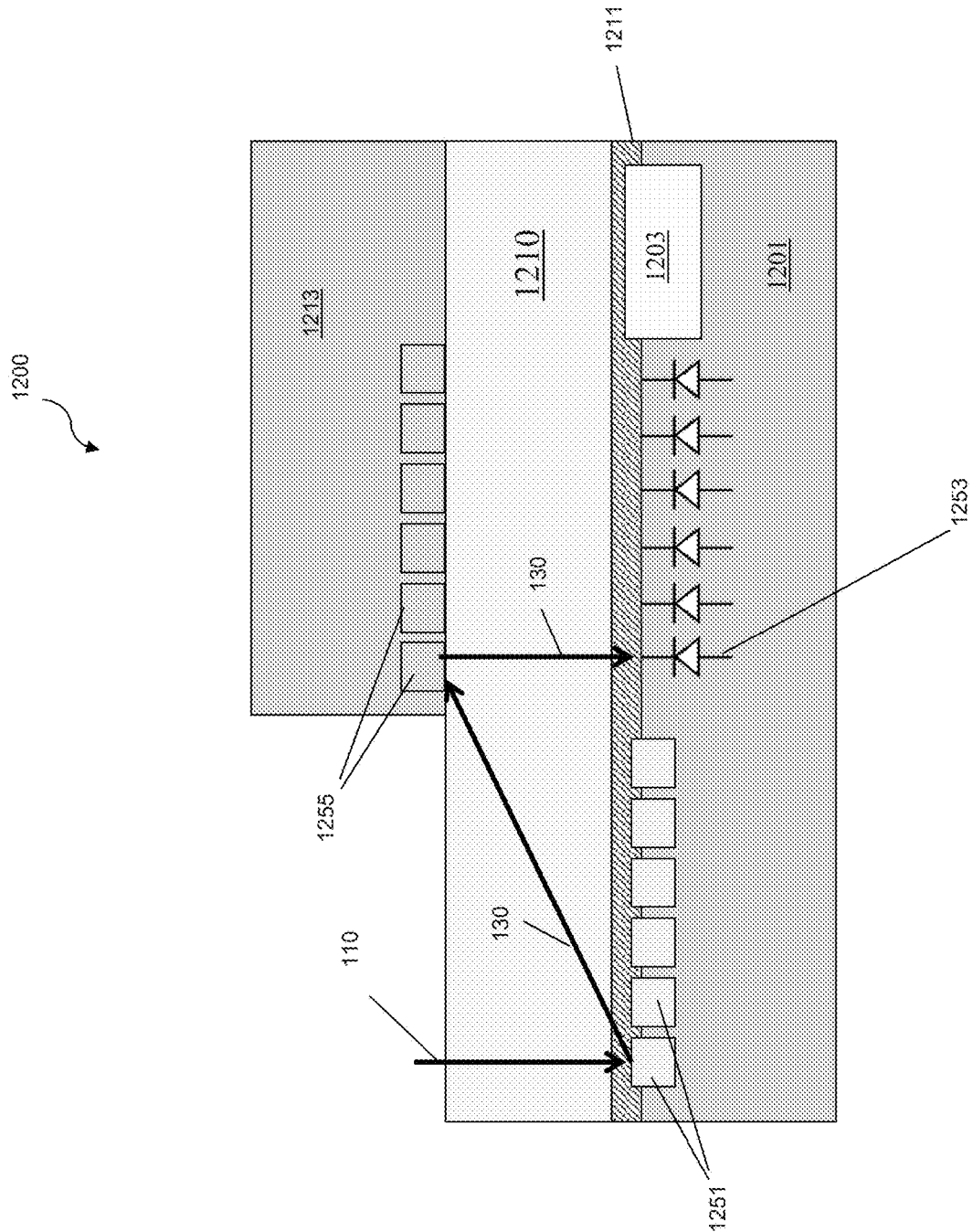
FIGS. 12A-12C illustrate cross-sectional views of a spectrometer, in accordance with an embodiment.
Figure 12C:
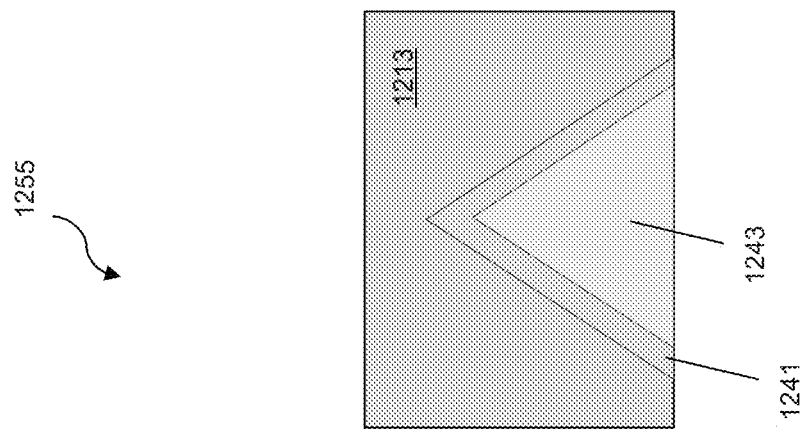
Figure 12B:
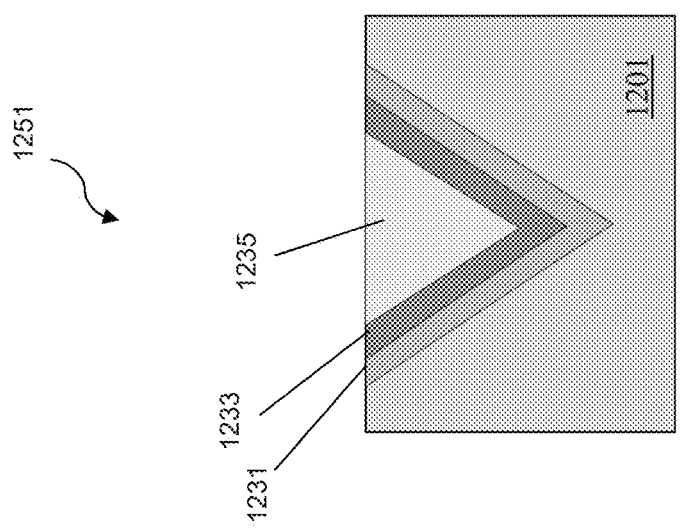

FIGS. 12A-12C illustrate cross-sectional views of various portions of a spectrometer 1200. As illustrated in FIG. 12A, the spectrometer 1200 comprises a substrate 1201, light detectors 1253, a circuit 1203, light filters 1251, and a transparent layer 1211. The substrate 1201, the circuit 1203, the light detectors 1253, and the transparent layer 1211 may be the same or similar to the substrate 1101, the circuit 1103, the light detectors 1153, and the transparent layer 1111 of FIG. 11, thus details are not repeated.

FIG. 12B illustrates a cross-sectional view of the light filters 1251, which is the same or similar to the light filter 501 of FIG. 5B. In particular, the light filter 1251 has layers 1231 and 1233, which are the same or similar to the layers 541 and 543 of FIG. 5B, respectively, in some embodiments. The light filter 1251 further has a transparent region 1234, which is the same or similar to the transparent region 545 of FIG. 5B, in the illustrated embodiment. For brevity, details are not repeated.

Referring back to FIG. 12A, the spectrometer 1200 further includes a transparent layer 1210 attached to the transparent layer 1211. The transparent layer 1210 may be, e.g., a glass layer, a quartz layer, or the like. Above the transparent layer 1210 are mirrors 1255 formed in a layer 1213, where the layer 1213 may be any suitable layer such as a silicon substrate.

FIG. 12C illustrates a cross-sectional view of the mirror 1255. As illustrated in FIG. 12C, the mirror 1255 comprise a V-shaped reflective layer 1241, and a transparent region 1243 filling the recess of the reflective layer 1241. Although not shown, the reflective layer 1241 may have other suitable shape such as a U-shape, a semispherical shape, or the like. The reflective layer 1241 is made of a reflective material that does not change the contents (e.g., wavelengths) of the light being reflected. Suitable material, such as silver, gold, or the like, may be used to form the reflective layer 1241. The transparent region 1243 comprises a passive transparent material (e.g., a transparent material with non-adjustable optical characteristics), in an exemplary embodiment, although the transparent region 1243 may comprise an active transparent material (e.g., an electro-optic material that is transparent) such that its optical characteristics are adjustable.

As illustrated in FIG. 12A, an incident light 110 passes through the transparent layer 1210, gets filtered and reflected by a light filter 1251. The reflected light 130 travels through the transparent layer 1210, gets reflected by a respective mirror 1255, and the reflected light 130 from the mirror 1255 travels through the transparent layer 1210 again to reach a respective light detector 1253. The light detectors 1253 may be any suitable light detector, e.g., the optoelectronic device with a V-shaped recess disclosed in U. S. Patent Publication No. 2014/0001521 A1. The locations of the light filters 1251 and the locations of the mirrors 1255, as illustrated in FIG. 12A, may be switched to form alternative embodiments. In other words, in other embodiments, the mirrors 1255 are formed in the substrate 1201 at locations of the filters 1251 in FIG. 12A, and the light filters 1251 are formed in the substrate 1213 at locations of the mirrors 1255 in FIG. 12A.

The shape (e.g., V-shape, U-shape, semispherical shape) of the reflective layer 1241 of the mirror 1255, the shape (e.g., V-shape, U-shape, semispherical shape) of the layers (e.g., 1231 and 1233) of the light filter 1251, and/or the V-shaped recess of the light detector 1253 may improve the geometry of the spectrometer and improve the detection efficiency. In embodiments where the light filter 1251 or the mirrors 1255 use active materials (e.g. the layers 1231, 1233, or 1243 are electro-optic materials), the electro-optic material may be adjusted to change the filtered wavelength or the angle of incidence of the light 110, thus improving the flexibility and accuracy of the spectrometer 1200. In embodiments where the mirrors 1255 use passive transparent material, all of the active structures (e.g., the light detectors 1253, the circuit 1203, and the light filters 1251 with electro-optic material) of the spectrometer 1200 can be fabricated in a first IC, which first IC includes elements below the transparent layer 1210 in FIG. 12A. The mirrors 1255 may be fabricated in a second IC that does not have active structures, on the substrate 1213. Having all active structures in one IC may simplify the design of the second IC comprising the mirrors 1255, and may reduce the manufacturing cost of the spectrometer 1200.

Figure 13:
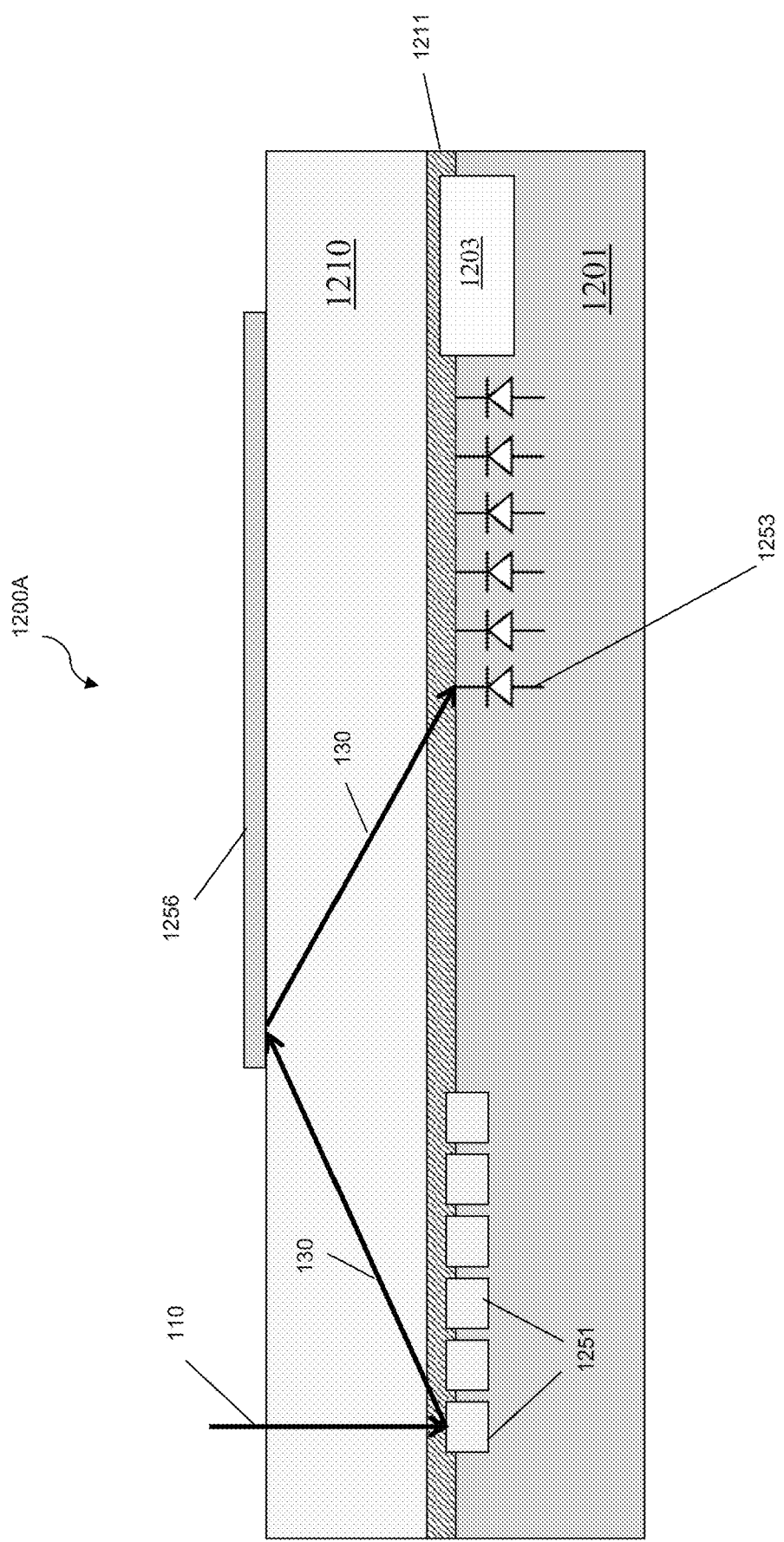
FIGS. 13, 14A-14B, 15, and 16 illustrate various embodiments of spectrometers.

FIGS. 13, 14A-14B, 15, and 16 illustrate various embodiments of spectrometers (e.g., 1200A, 1200B, 1200C, and 1200D) that are similar to the spectrometer 1200 of FIGS. 12A-12C, but with modifications. Unless otherwise specified, like reference numerals in FIGS. 12A, 13, 14A-14B, 15, and 16 refer to the same or similar components, thus details are not repeated. FIG. 13 illustrates a cross-sectional view of a spectrometer 1200A. The spectrometer 1200A in FIG. 13 is similar to the spectrometer 1200 of FIG. 12A, but with the mirrors 1255 and the layer 1213 replaced with a single mirror 1256.

In FIG. 13, the mirror 1256 has a planar lower surface that is reflective. The mirror 1256 does not change the contents (e.g., wavelengths) of the light being reflected. The light 110 travels through the transparent layer 1210, gets filtered and reflected by the light filter 1251, the reflected light 130 from the light filter 1251 is reflected again by the mirror 1256 toward the light detector 1253. In some embodiments, the light filter 1251 comprises an electro-optic material, and the optical characteristics of the light filter 1251 is adjusted to change the filtered wavelength and the various angles (e.g., angle of incidence, angle of reflection) of the light path. The spectrometer 1200A uses a mirror 1256 in place of the IC comprising the plurality of mirrors 1255 (see FIG. 12A), thereby simplifying the design and reducing the cost of the spectrometer 1200A.

Figure 14A:
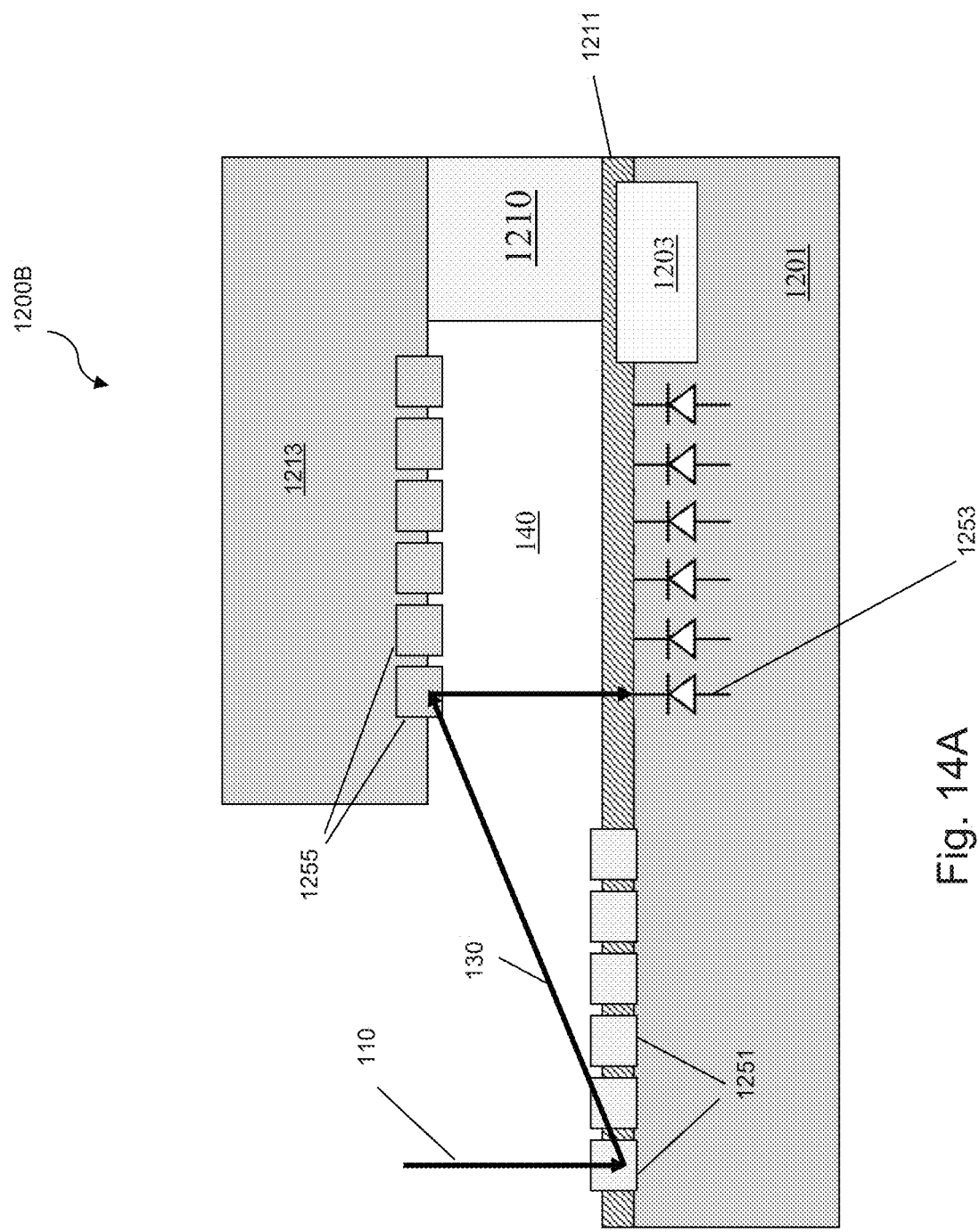
Figure 14B:
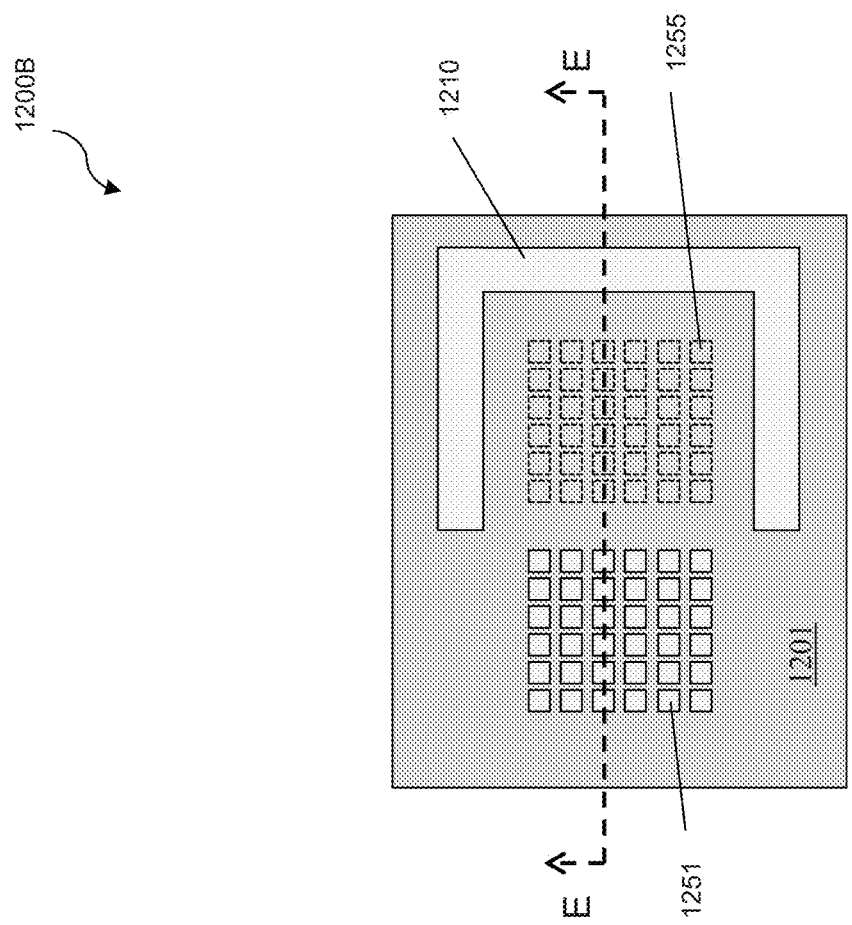

FIGS. 14A and 14B illustrate a cross-sectional view and a plan view of a spectrometer 1200B, respectively, in an embodiment. In particular, FIG. 14A is the cross-section view of the spectrometer 1200B of FIG. 14B along cross-section E-E. For simplicity, not all features are illustrated in FIGS. 14A and 14B. As illustrated in FIG. 14B, the transparent layer 1210 has a U-shape and surrounds three sides of the region having the mirrors 1255 in the plan view. As a result, there is an empty space 140 (see FIG. 14A) between the substrate 1201 and the layer 1213. Additionally, the light filters 1251 are formed at the upper surface of the transparent layer 1211 and are at least partially exposed by the transparent layer 1211. Similarly, the mirrors 1255 are formed at the lower surface of the layer 1213 and are at least partially exposed by the layer 1213. Although not illustrated, each of the light filters 1251 and each of the mirrors 1255 may be attached to one or more respective MEMS arms (e.g., PZT beams, bi-metallic beams), and therefore, may be movable (e.g., able to tilt to the left or right, or move up-and-down). The MEMS arms may be controlled, e.g., by a control voltage, in real-time to change the light transmitted or reflected by the light filters 1251 (as shown in FIG. 2H) and/or the positions of the mirrors 1255, thereby changing the various angles (e.g., angle of incidence, angle of reflection) of the light path. In some embodiments, the mirrors 1255 have a same or similar structure as the light filters 1251, thus both the mirrors 1255 and the light filters 1251 are used for filtering light and reflecting light.

Figure 15:
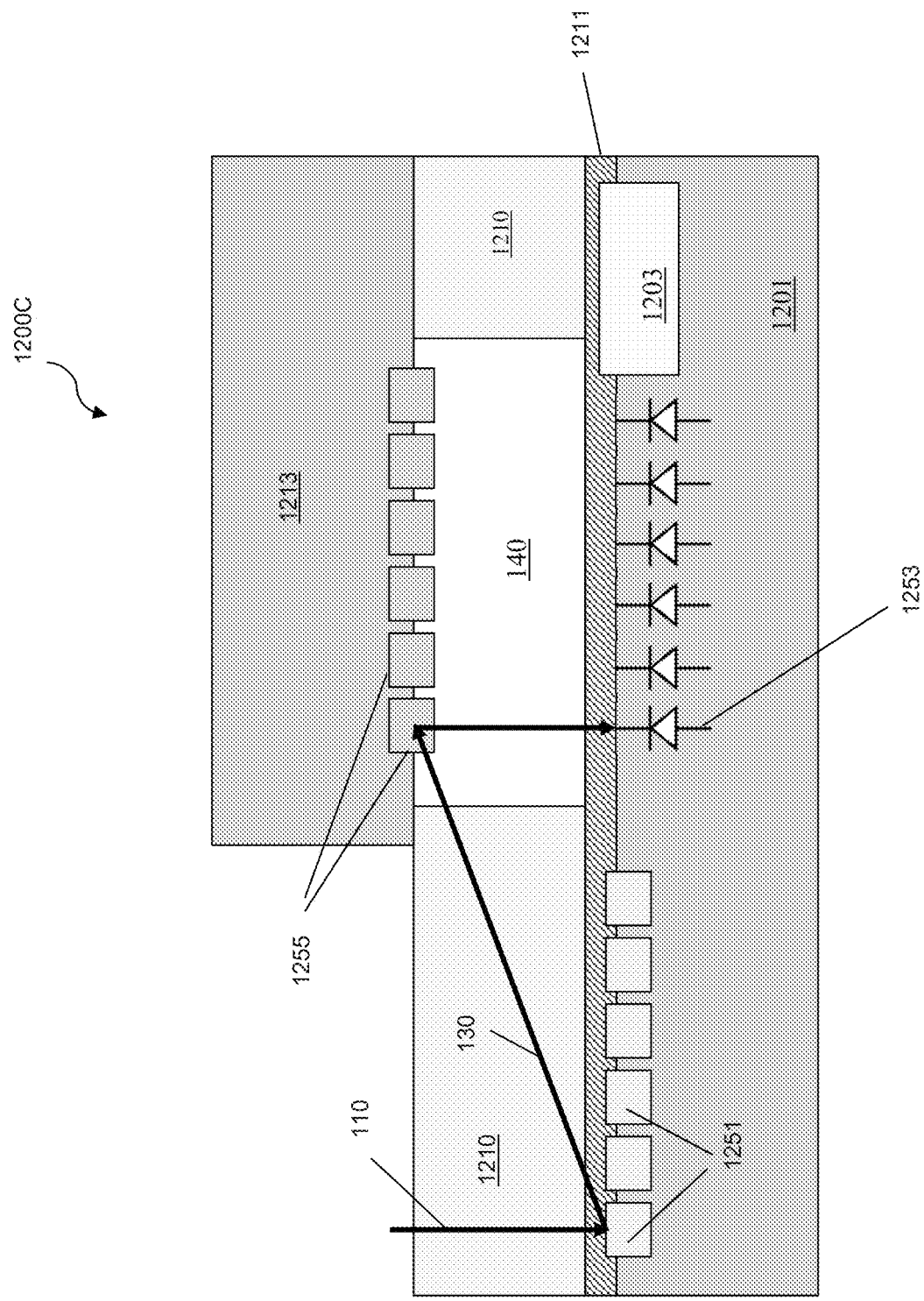

FIG. 15 illustrates a cross-sectional view of a spectrometer 1200C. The spectrometer 1200C is similar to the spectrometer 1200B, but with the transparent layer 1210 formed around the region of the mirrors 1255 and over the light filters 1251. The transparent layer 1210 encircles the space 140 in FIG. 15. The light filters 1251 are formed below the upper surface of the transparent layer 1211, thus are fixed (e.g., not movable). In contrast, the mirrors 1255 are exposed at the lower surface of the layer 1213, and may be attached to MEMS arms (not illustrated), thus are movable. The light path (e.g., 110, 130) of the spectrometer 1200C includes portions in the transparent layer 1210 and portions in the space 140. In some embodiments, the mirrors 1255 have a same or similar structure as the light filters 1251, thus both the mirrors 1255 and the light filters 1251 are used for filtering light and reflecting light.

Figure 16:
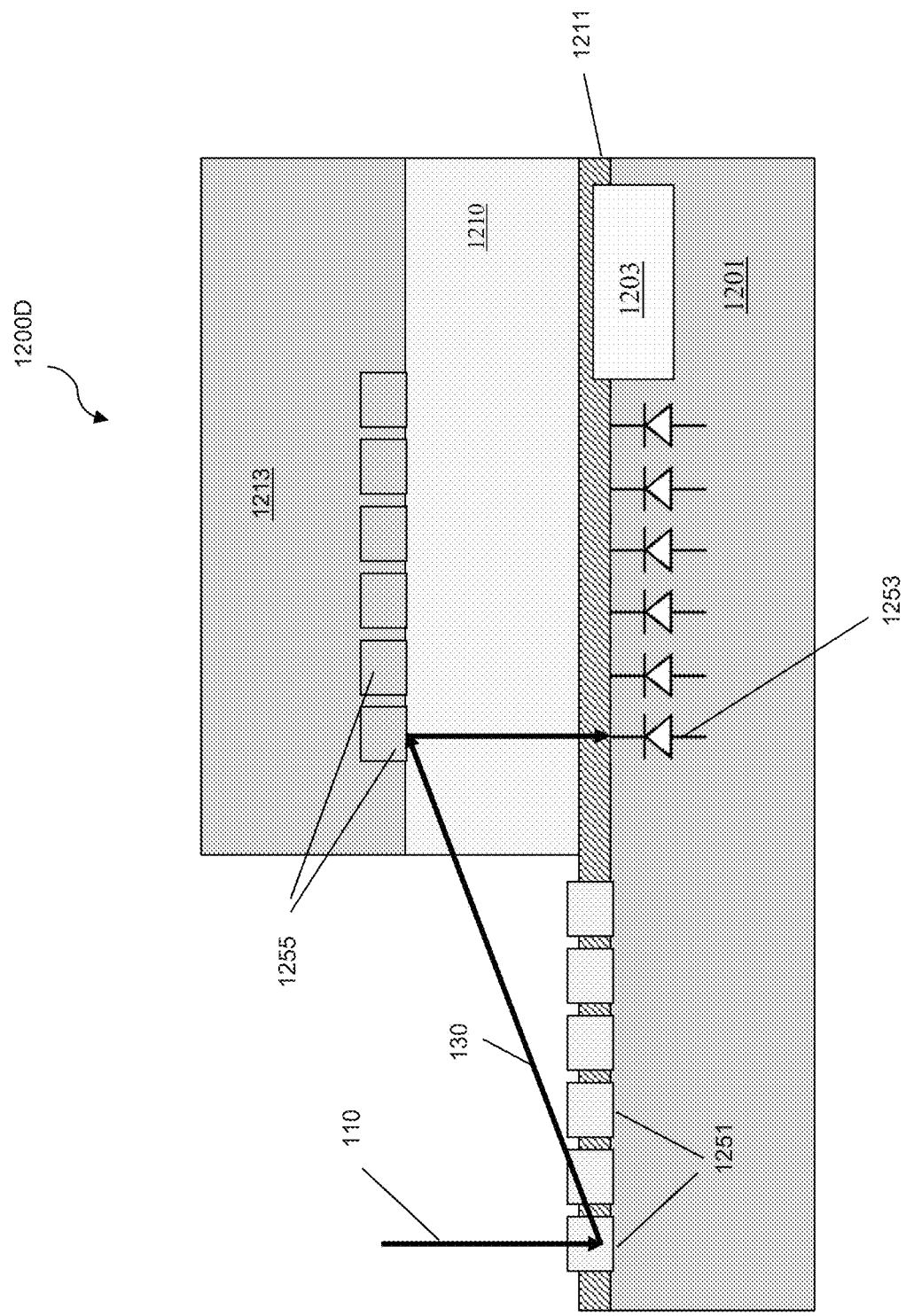

FIG. 16 illustrates a cross-sectional view of a spectrometer 1200D. The spectrometer 1200D is similar to the spectrometer 1200B, but with the transparent layer 1210 formed under the mirrors 1255, and fills a space between the layer 1213 and the substrate 1201. The mirrors 1255 are fixed (e.g., not movable) in the example of FIG. 16. In contrast, the light filters 1251 are exposed at the upper surface of the transparent layer 1211, and may be attached to MEMS arms (not illustrated), thus may be movable. In some embodiments, the mirrors 1255 have a same or similar structure as the light filters 1251, thus both the mirrors 1255 and the light filters 1251 are used for filtering light and reflecting light.

Figure 18:
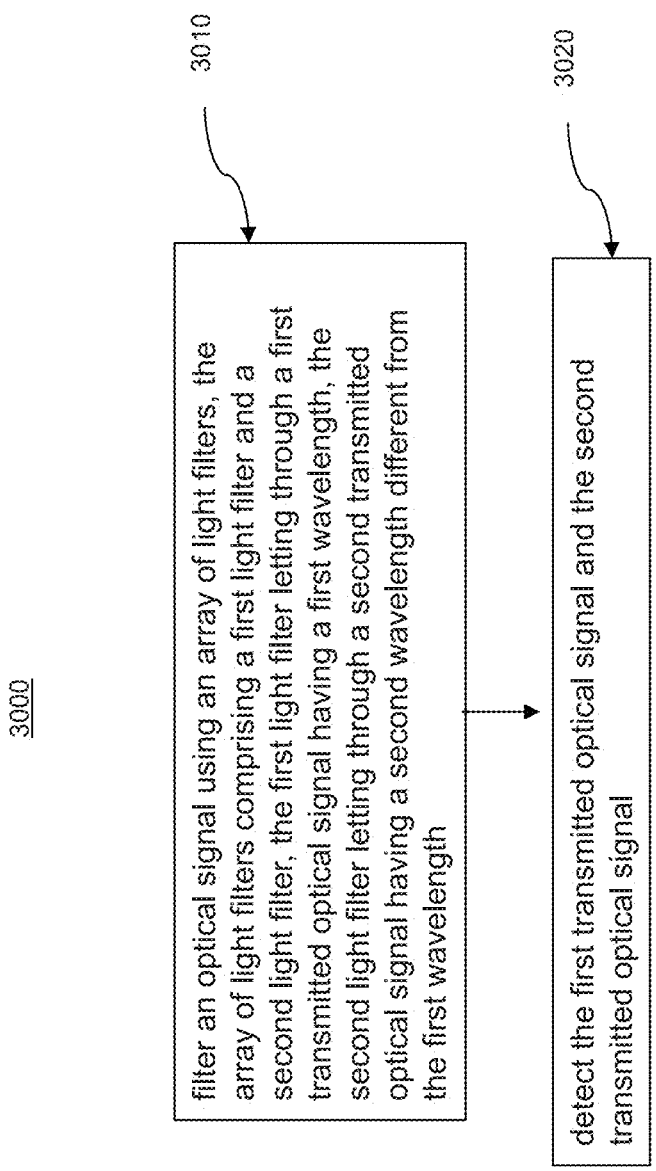
FIG. 18 illustrates a flow char of a method for analyzing a light, in accordance with some embodiments.

FIG. 18 illustrates a flow chart of a method 3000 of analyzing a light, in accordance with some embodiments. It should be understood that the embodiment method shown in FIG. 18 is merely an example of many possible embodiment methods. One of ordinary skill in the art would recognize many variations, alternatives, and modifications. For example, various steps as illustrated in FIG. 18 may be added, removed, replaced, rearranged and repeated.

Referring to FIG. 18, at step 3010, an optical signal is filtered using an array of light filters, the array of light filters comprising a first light filter and a second light filter, the first light filter letting through a first transmitted optical signal having a first wavelength, the second light filter letting through a second transmitted optical signal having a second wavelength different from the first wavelength. At step 3020, the first transmitted optical signal and the second transmitted optical signal are detected.

Embodiments may achieve advantages. By forming an array or a matrix of light filters, each of which transmitting or reflecting a different light component with a different wavelength, spatial wavelength dispersion is achieved in a compact spectrometer design suitable for integration in semiconductor devices. By using electro-optic material for the light filters, the optical characteristics of each of the light filters may be adjusted over time to achieve temporal wavelength dispersion, thereby furthering reducing the size of the spectrometer through a trade-off between size and detection time. Various embodiments include spectrometers using passive interferential light filters, active interferential light filters, or prism-based light filters. The use of electro-optic material allows for easy adjustment of the optical characteristics of the light filters and design flexibility.

Example embodiments of the present invention are summarized here. Other embodiments can also be understood from the entirety of the specification and the claims filed herein.

Example 1

In an embodiment, a spectrometer includes a substrate, a plurality of light detectors in the substrate, and a plurality of light filters over the plurality of light detectors, each of the plurality of light filters transmitting a different wavelength or reflecting a different wavelength, each of the light filters aligned with a corresponding one of the plurality of light detectors.

Example 2

The spectrometer of example 1, wherein the plurality of light filters are configured in an array.

Example 3

The spectrometer of example 1, wherein the plurality of light filters are configured in a matrix.

Example 4

The spectrometer of example 1, wherein each of the plurality of light filters comprises an electro-optic material, and optical characteristics of each of the plurality of light filters are configured to be adjustable.

Example 5

The spectrometer of example 4, wherein the optical characteristics of each of the plurality of light filters comprise a wavelength transmitted or reflected by the each of the plurality of light filters.

Example 6

The spectrometer of example 4, wherein the optical characteristics of each of the plurality of light filters are configured to be adjusted by changing an electrical field applied, an electrical voltage applied, or by changing a temperature of each of the plurality of light filters.

Example 7

The spectrometer of example 1, wherein each of the plurality of light filters comprises a plurality of sublayers, each of the sublayers having a refractive index, wherein there is a step change between refractive indexes of adjacent sublayers.

Example 8

The spectrometer of example 7, wherein a sublayer of the plurality of sublayers comprises a gas or a fluid.

Example 9

The spectrometer of example 1, wherein the plurality of light filters comprise electro-optic materials, wherein the spectrometer further comprises a circuit in the substrate, wherein the circuit is electrically coupled to the plurality of light filters, and wherein the circuit is configured to change optical characteristics of the plurality of light filters over time.

Example 10

The spectrometer of example 9, further comprising: a plurality of first transparent regions at least partially in the substrate and laterally adjacent to the plurality of light detectors; and a plurality of second transparent regions over the substrate and at least partially between the plurality of light filters and the plurality of light detectors.

Example 11

In an embodiment, a spectrometer includes a substrate, a plurality of light detectors in the substrate, a first layer over the substrate, and a prism at least partially in the first layer, the prism comprising an electro-optic material.

Example 12

The spectrometer of example 11, further comprising a circuit in the substrate, wherein the circuit is electrically coupled to the prism, wherein the circuit is configured to adjust optical characteristics of the prism.

Example 13

The spectrometer of example 11 or 12, further comprising a first opening in the first layer, wherein the prism is at least partially in the first opening, wherein the spectrometer further comprises movable microelectromechanical systems (MEMS) arms attached to the prism, wherein the movable MEMS arms are configured to mechanically adjust a position of the prism.

Example 14

The spectrometer of example 11 or 12 further comprising a lens over the prism, wherein the lens is configured to focus light on two intersecting surfaces of the prism.

Example 15

In an embodiment, a method includes filtering an optical signal using an array of light filters, the array of light filters comprising a first light filter and a second light filter, the first light filter letting through a first transmitted optical signal having a first wavelength, the second light filter letting through a second transmitted optical signal having a second wavelength different from the first wavelength, and detecting the first transmitted optical signal and the second transmitted optical signal.

Example 16

The method of example 15, wherein the first light filter comprises a first electro-optic material different from a second electro-optic material of the second light filter.

Example 17

The method of example 16, wherein the method further comprises: after detecting the first transmitted optical signal and the second transmitted optical signal, changing first optical characteristics of the first light filter and changing second optical characteristics of the second light filter; after the changing, filtering the optical signal using the array of light filters, the first light filter letting through a third transmitted optical signal with a third wavelength, the second light filter letting through a fourth transmitted optical signal with a fourth wavelength different from the third wavelength; and detecting the third transmitted optical signal and the fourth transmitted optical signal.

Example 18

The method of example 17, wherein the changing comprises changing a voltage, or a temperature of each of the array of light filters.

Example 19

The method of example 15, wherein the first light filter reflects a first reflected optical signal having a third wavelength, and the second light filter reflects a second reflected optical signal having a fourth wavelength different from the third wavelength, wherein the method further comprises detecting the first reflected optical signal and the second reflected optical signal.

Example 20

The method of example 19, further comprising: after detecting the first transmitted optical signal, the second transmitted optical signal, the first reflected optical signal, and the second reflected optical signal, changing optical characteristics of the array of light filters such that wavelengths of transmitted optical signals and wavelengths of reflected optical signals are changed; after changing the optical characteristics of the array of light filters, filtering the optical signal using the array of light filters, wherein the first light filter lets through a third transmitted optical signal and reflects a third reflected optical signal, and the second light filter lets through a fourth transmitted optical signal and reflects a fourth reflected optical signal; and detecting the third transmitted optical signal, the fourth transmitted optical signal, the third reflected optical signal, and the fourth reflected optical signal.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A spectrometer comprising:
    a substrate;
    a plurality of light detectors in the substrate;
    a plurality of light filters over the plurality of light detectors, the plurality of light filters comprising electro-optic materials, each of the plurality of light filters transmitting a different wavelength or reflecting a different wavelength, each of the plurality of light filters aligned with a corresponding one of the plurality of light detectors; and
    a circuit in the substrate, wherein the circuit is electrically coupled to the plurality of light filters, and wherein the circuit is configured to change optical characteristics of the plurality of light filters over time.

2. The spectrometer of claim 1, wherein the plurality of light filters are configured in an array.

3. The spectrometer of claim 1, wherein the plurality of light filters are configured in a matrix.

4. The spectrometer of claim 1, wherein each of the plurality of light filters comprises an electro-optic material, and optical characteristics of each of the plurality of light filters are configured to be adjustable.

5. The spectrometer of claim 4, wherein the optical characteristics of each of the plurality of light filters comprise a wavelength transmitted or reflected by the each of the plurality of light filters.

6. The spectrometer of claim 4, wherein the optical characteristics of each of the plurality of light filters are configured to be adjusted by changing an electrical field applied, an electrical voltage applied, or by changing a temperature of each of the plurality of light filters.

7. The spectrometer of claim 1, further comprising:
    a plurality of first transparent regions at least partially in the substrate and laterally adjacent to the plurality of light detectors; and
    a plurality of second transparent regions over the substrate and at least partially between the plurality of light filters and the plurality of light detectors.

8. The spectrometer of claim 1, further comprising a plurality of layers over the substrate, wherein the plurality of light detectors are disposed in the plurality of layers.

9. The spectrometer of claim 8, wherein the plurality of layer are non-transparent to wavelengths of the light analyzed by the plurality of light filters.

10. The spectrometer of claim 9, wherein the plurality of layers comprise silicon, a dielectric material, or a polymer.

11. The spectrometer of claim 1, further comprising a transparent layer between the plurality of light filters and the plurality of light detectors, the transparent layer being transparent to wavelengths of the light analyzed by the plurality of light filters, the transparent layer contacting an upper surface of the substrate.

12. A spectrometer comprising:
a substrate;
a plurality of light detectors in the substrate;
a first layer over the substrate; and
a prism at least partially in the first layer, the prism comprising an electro-optic material.

13. The spectrometer of claim 12, further comprising a circuit in the substrate, wherein the circuit is electrically coupled to the prism, wherein the circuit is configured to adjust optical characteristics of the prism.

14. The spectrometer of claim 13, further comprising a first opening in the first layer, wherein the prism is at least partially in the first opening, wherein the spectrometer further comprises movable microelectromechanical systems (MEMS) arms attached to the prism, wherein the movable MEMS arms are configured to mechanically adjust a position of the prism.

15. The spectrometer of claim 13, further comprising a lens over the prism, wherein the lens is configured to focus light on two intersecting surfaces of the prism.

16. A method comprising:
filtering an optical signal using an array of light filters, the array of light filters comprising a first light filter and a second light filter, the first light filter comprising a first electro-optic material different from a second electro-optic material of the second light filter, the first light filter letting through a first transmitted optical signal having a first wavelength, the second light filter letting through a second transmitted optical signal having a second wavelength different from the first wavelength; and
detecting the first transmitted optical signal and the second transmitted optical signal.

17. The method of claim 16, wherein the method further comprises:
after detecting the first transmitted optical signal and the second transmitted optical signal, changing first optical characteristics of the first light filter and changing second optical characteristics of the second light filter;
after the changing, filtering the optical signal using the array of light filters, the first light filter letting through a third transmitted optical signal with a third wavelength, the second light filter letting through a fourth transmitted optical signal with a fourth wavelength different from the third wavelength; and
detecting the third transmitted optical signal and the fourth transmitted optical signal.

18. The method of claim 17, wherein the changing comprises changing a voltage or a temperature of each of the array of light filters.

19. The method of claim 16, wherein the first light filter reflects a first reflected optical signal having a third wavelength, and the second light filter reflects a second reflected optical signal having a fourth wavelength different from the third wavelength, wherein the method further comprises detecting the first reflected optical signal and the second reflected optical signal.

20. The method of claim 19, further comprising:
after detecting the first transmitted optical signal, the second transmitted optical signal, the first reflected optical signal, and the second reflected optical signal, changing optical characteristics of the array of light filters such that wavelengths of transmitted optical signals and wavelengths of reflected optical signals are changed;
after changing the optical characteristics of the array of light filters, filtering the optical signal using the array of light filters, wherein the first light filter lets through a third transmitted optical signal and reflects a third reflected optical signal, and the second light filter lets through a fourth transmitted optical signal and reflects a fourth reflected optical signal; and
detecting the third transmitted optical signal, the fourth transmitted optical signal, the third reflected optical signal, and the fourth reflected optical signal.

* * * * *